United States Patent
King et al.

(10) Patent No.: US 10,852,912 B2
(45) Date of Patent: Dec. 1, 2020

(54) IMAGE CREATION APP IN MESSAGING APP

(71) Applicant: Apple Inc., Cupertino, CA (US)

(72) Inventors: Nicholas V. King, San Jose, CA (US); Lisa K. Kvarda, Santa Clara, CA (US); Anthony D'Auria, San Francisco, CA (US); Christopher P. Saari, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 70 days.

(21) Appl. No.: 15/399,115

(22) Filed: Jan. 5, 2017

(65) Prior Publication Data

US 2017/0357432 A1 Dec. 14, 2017

Related U.S. Application Data

(60) Provisional application No. 62/349,087, filed on Jun. 12, 2016, provisional application No. 62/349,101, (Continued)

(51) Int. Cl.
G06F 3/0482 (2013.01)
H04L 12/58 (2006.01)
(Continued)

(52) U.S. Cl.
CPC .......... *G06F 3/0482* (2013.01); *G06F 3/0481* (2013.01); *G06F 3/0488* (2013.01); *H04L 51/10* (2013.01); *H04L 51/38* (2013.01)

(58) Field of Classification Search
CPC ............. G06F 3/04883; G06F 3/0482; G06F 3/04886; H04W 4/12; H04W 4/14; H04L 51/04; H04L 51/10; H04L 51/38
See application file for complete search history.

(56) References Cited

U.S. PATENT DOCUMENTS 5,903,728 A   5/1999   Semenzato
6,199,107 B1  3/2001   Dujari
(Continued)

FOREIGN PATENT DOCUMENTS

EP   2779580            9/2014
WO   WO 2015/162072 A2  10/2015
WO   WO 2015/183456 A1  12/2015

OTHER PUBLICATIONS

Neil Gonzalez, "10 Third-Party Apps for Facebook Messenger You Should Install Right Now," Mar. 27, 2015, GadgetHacks.com, available at https://smartphones.gadgethacks.com/how-to/10-third-party-apps-for-facebook-messenger-you-should-install-right-now-0161054/ , pp. 1-16. (Year: 2015).*
(Continued)

*Primary Examiner* — Dino Kujundzic

(74) *Attorney, Agent, or Firm* — Morgan, Lewis & Bockius LLP

(57) ABSTRACT

An image creation app is used in conjunction with the messaging app to create one or more drawn images which can be sent by the messaging app to other messaging apps. In one embodiment, the image creation app can be either a plug-in, of the messaging app sir an extension app of the messaging app. In one embodiment, a counterpart image creation app on the receiving device can create modifications of the one or more images and send those back to the first messaging app.

24 Claims, 32 Drawing Sheets

Related U.S. Application Data filed on Jun. 12, 2016, provisional application No. 62/349,113, filed on Jun. 12, 2016, provisional application No. 62/349,091, filed on Jun. 12, 2016.

(51) Int. Cl.
*G06F 3/0488* (2013.01)
*G06F 3/0481* (2013.01)

(56) References Cited

U.S. PATENT DOCUMENTS

| | | |
|---|---|---|
| 6,216,112 B1 | 4/2001 | Fuller |
| 6,687,745 B1 | 2/2004 | Franco |
| 7,130,885 B2 | 10/2006 | Chandra et al. |
| 7,379,705 B1 | 5/2008 | Rados |
| 7,669,134 B1 | 2/2010 | Christie et al. |
| 7,899,917 B2 | 3/2011 | Chitre |
| 8,176,321 B1 | 5/2012 | Perry |
| 8,225,061 B2 | 7/2012 | Greenebaum |
| 8,539,368 B2 | 9/2013 | Nam |
| 8,763,009 B2 | 6/2014 | Degirmenci |
| 9,027,078 B1 | 5/2015 | Manmohan |
| 9,094,353 B2 | 7/2015 | O'Sullivan |
| 9,455,876 B1 | 9/2016 | Grebenschikov |
| 9,575,740 B2 | 2/2017 | Sankaranarasimhan |
| 9,990,128 B2 | 6/2018 | Peterson et al. |
| 9,992,150 B2 | 6/2018 | Koolwal |
| 10,368,208 B2 | 7/2019 | Ciechanowski et al. |
| 10,419,514 B2 | 9/2019 | Straub |
| 2002/0130904 A1* | 9/2002 | Becker ............ G06F 3/0481 715/753 |
| 2003/0101092 A1 | 5/2003 | Fuller |
| 2003/0110211 A1 | 6/2003 | Danon |
| 2003/0110450 A1 | 6/2003 | Sakai |
| 2003/0163525 A1* | 8/2003 | Hendriks ............ G06Q 10/10 709/204 |
| 2004/0054740 A1 | 3/2004 | Daigle et al. |
| 2005/0021834 A1 | 1/2005 | Coulombe |
| 2005/0143136 A1* | 6/2005 | Lev ............... H04L 29/06 455/566 |
| 2005/0159135 A1 | 7/2005 | Kim |
| 2005/0257057 A1 | 11/2005 | Ivanov |
| 2007/0208813 A1 | 9/2007 | Blagsvedt |
| 2007/0244980 A1* | 10/2007 | Baker, III ............ G06Q 10/107 709/207 |
| 2007/0300160 A1 | 12/2007 | Ferrel |
| 2008/0105742 A1 | 5/2008 | Kim |
| 2008/0114848 A1 | 5/2008 | Lira |
| 2009/0271707 A1 | 10/2009 | Lin et al. |
| 2010/0223314 A1* | 9/2010 | Gadel ............... G11B 27/034 709/200 |
| 2011/0016184 A1 | 1/2011 | Wen |
| 2011/0093567 A1 | 4/2011 | Jeon |
| 2011/0179483 A1 | 7/2011 | Paterson |
| 2011/0276904 A1* | 11/2011 | Mehin ............ H04L 12/1827 715/758 |
| 2011/0289513 A1* | 11/2011 | Degirmenci ............ G06F 9/542 719/313 |
| 2012/0050264 A1 | 3/2012 | Karaoguz |
| 2012/0054259 A1 | 3/2012 | Peng |
| 2012/0064976 A1 | 3/2012 | Gault |
| 2012/0095796 A1 | 4/2012 | Gately |
| 2012/0114108 A1 | 5/2012 | Katis |
| 2012/0185542 A1 | 7/2012 | Vyrros et al. |
| 2012/0290945 A1 | 11/2012 | Byrne |
| 2013/0018701 A1 | 1/2013 | Dusig |
| 2013/0055112 A1 | 2/2013 | Joseph |
| 2013/0110947 A1 | 5/2013 | Boukadakis |
| 2013/0325987 A1 | 12/2013 | Lee |
| 2014/0007263 A1 | 1/2014 | Altman |
| 2014/0075333 A1 | 3/2014 | Taneja |
| 2014/0173460 A1 | 6/2014 | Kim |
| 2014/0280122 A1 | 9/2014 | Grossman et al. |
| 2014/0281929 A1 | 9/2014 | Grossman et al. |
| 2014/0282179 A1 | 9/2014 | Grossman et al. |
| 2014/0282192 A1 | 9/2014 | Grossman et al. |
| 2014/0289195 A1 | 9/2014 | Chan |
| 2015/0009536 A1 | 1/2015 | Sparks |
| 2015/0085433 A1 | 3/2015 | Kim |
| 2015/0089389 A1* | 3/2015 | Cohen-Zur ............ H04W 4/12 715/752 |
| 2015/0094106 A1* | 4/2015 | Grossman ............... H04W 4/12 455/466 |
| 2015/0095804 A1 | 4/2015 | Grossman et al. |
| 2015/0095902 A1 | 4/2015 | Boss |
| 2015/0178287 A1 | 6/2015 | Kim |
| 2015/0220949 A1 | 8/2015 | Pinsley |
| 2015/0278513 A1 | 10/2015 | Krasin |
| 2015/0309720 A1* | 10/2015 | Fisher ................ G06F 3/04847 715/752 |
| 2015/0312176 A1 | 10/2015 | Jones |
| 2015/0334075 A1 | 11/2015 | Wang |
| 2015/0347748 A1 | 12/2015 | Krstic et al. |
| 2015/0358411 A1 | 12/2015 | Kruglick |
| 2016/0012465 A1 | 1/2016 | Sharp |
| 2016/0029146 A1 | 1/2016 | Tembey |
| 2016/0063276 A1 | 3/2016 | Pycock |
| 2016/0085602 A1 | 3/2016 | Jacobsen |
| 2016/0100298 A1 | 4/2016 | Peterson |
| 2016/0110322 A1 | 4/2016 | Miller |
| 2016/0140362 A1 | 5/2016 | Aghill |
| 2016/0149848 A1 | 5/2016 | Vembu |
| 2016/0173436 A1 | 6/2016 | Koolwal |
| 2016/0202889 A1 | 7/2016 | Shin |
| 2016/0294958 A1 | 10/2016 | Zhang |
| 2016/0299636 A1 | 10/2016 | Lindenberg |
| 2016/0301641 A1 | 10/2016 | Belliston |
| 2016/0352412 A1 | 12/2016 | DiCostanzo |
| 2016/0371495 A1 | 12/2016 | Bhat |
| 2016/0378081 A1 | 12/2016 | Della Corte |
| 2016/0381023 A1 | 12/2016 | Dulce |
| 2017/0005806 A1 | 1/2017 | Brand |
| 2017/0093769 A1 | 3/2017 | Lind |
| 2017/0180517 A1 | 6/2017 | Kornmann |
| 2017/0188177 A1 | 6/2017 | Kawsar |
| 2017/0201371 A1 | 7/2017 | Yagisawa |
| 2017/0214640 A1* | 7/2017 | Miance ............ H04L 51/08 |
| 2017/0286913 A1 | 10/2017 | Liu |
| 2017/0339085 A1* | 11/2017 | Judd ............... G06F 17/2235 |
| 2017/0357415 A1 | 12/2017 | Peterson et al. |
| 2017/0358117 A1 | 12/2017 | Goossens |
| 2017/0359279 A1 | 12/2017 | Peterson et al. |
| 2017/0359281 A1 | 12/2017 | Yip et al. |
| 2017/0359282 A1 | 12/2017 | Alsina et al. |
| 2017/0359283 A1 | 12/2017 | Bernstein |
| 2017/0359285 A1 | 12/2017 | Weinig et al. |
| 2017/0359701 A1 | 12/2017 | Sarma et al. |
| 2017/0359702 A1 | 12/2017 | Peterson et al. |

OTHER PUBLICATIONS

AJ Dellinger, "The coolest new apps for Facebook Messenger," Mar. 26, 2015, DailyDot.com, available at https://www.dailydot.com/debug/best-apps-for-facebook-messenger-platform/, pp. 1-11. (Year: 2015).*

Caitlin McGarry, "How Facebook Messenger will help you discover new apps," Mar. 26, 2015, Macworld.com, retrieved from: https://www.macworld.com/article/2902295/how-facebook-messenger-will-help-you-discover-new-apps.html , 3 pages. (Year: 2015).*

Christian Zibreg, "Facebook updates Messenger with third-party app support," Mar. 30, 2015, idownloadblog.com, retrieved from: https://www.idownloadblog.conn/2015/03/30/facebook-messenger-app-support/ , 2 pages. (Year: 2015).*

Complete Guide—Messenger Platform—Technical Implementation, downloaded May 27, 2016, https://developers.facebook.com/docs/messenger-platform/implementation. 18 pages.

Getting Started—Messenger Platform—downloaded May 27, 2016, http://developers.facebook.com/docs/messenger-platform/quickstart, 6 pages.

Google launches time-saving keyboard for iPhones, May 12, 2016, 2 pages.

(56) References Cited

OTHER PUBLICATIONS

Business Insider—Snapchat now lets you add fun stickers to photos and videos, May 23, 2016, 4 pages.
U.S. Appl. No. 15/275,136, filed Sep. 23, 2016.
U.S. Appl. No. 15/275,103, filed Sep. 23, 2016.
U.S. Appl. No. 15/389,219, filed Dec. 22, 2016.
U.S. Appl. No. 15/400,544, filed Jan. 6, 2017.
U.S. Appl. No. 15/399,203, filed Jan. 5, 2017.
U.S. Appl. No. 15/411,176, filed Jan. 20, 2017.
U.S. Appl. No. 15/389,230, filed Dec. 22, 2016.
U.S. Appl. No. 15/272,230, filed Sep. 21, 2016.
U.S. Appl. No. 15/398,553, filed Jan. 4, 2017.
U.S. Appl. No. 15/400,780, Jan. 6, 2017.
U.S. Appl. No. 15/274,518, filed Sep. 23, 2016.
European Patent Application No. 17174969.0, Partial European Search Report dated Jul. 26, 2017, 13 pages.
PCT International Search Report and Written Opinion for International Application No. PCT/US2017/034340, dated Jul. 19, 2017, 10 pages.
"[App] Kakao Talk Speech recognition is pretty good," http://zzznara2.tistory.com/480, Jan. 24, 2016, 4 pages.
Extended European Search Report from European Patent Application No. 19202061.8, dated Jan. 24, 2020, 5 pages.

\* cited by examiner

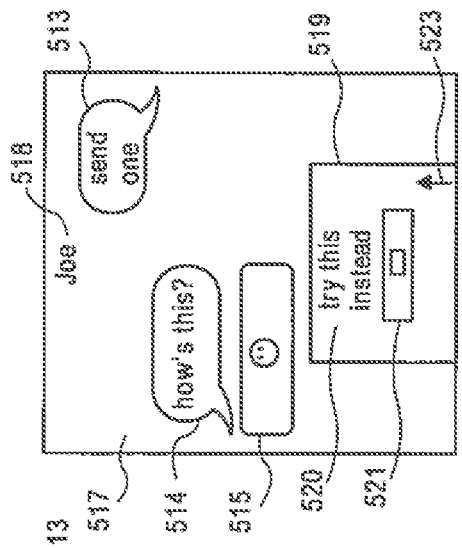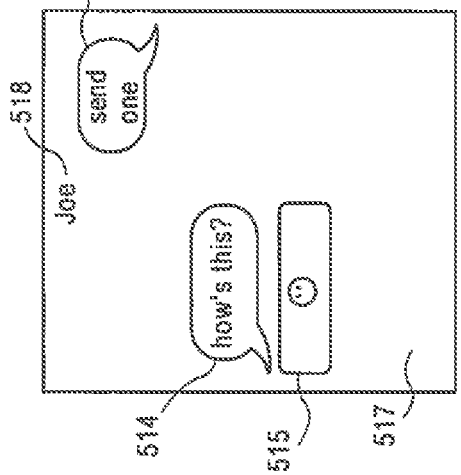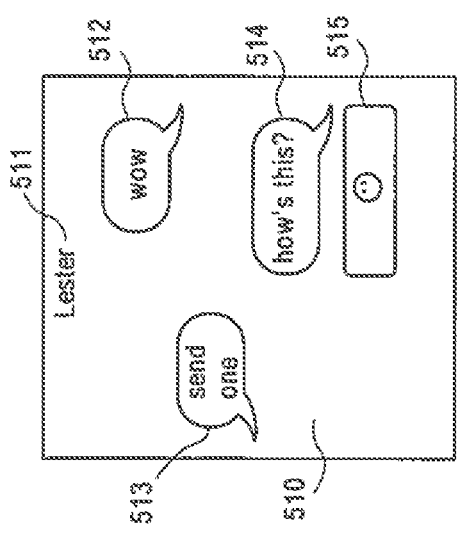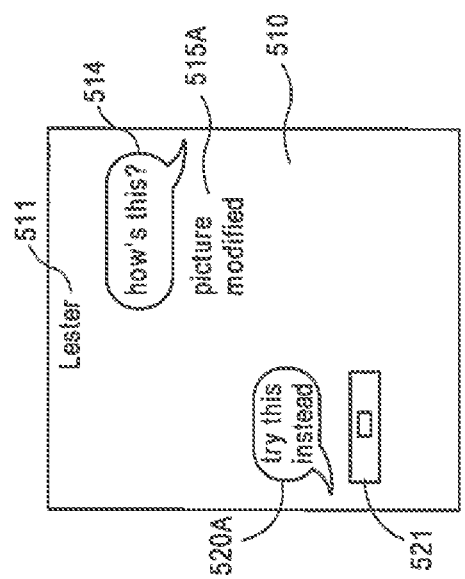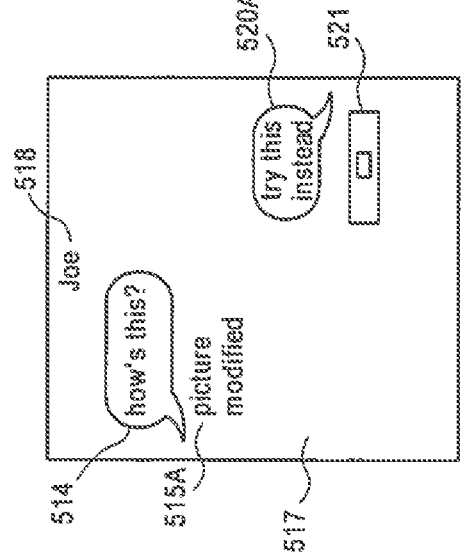

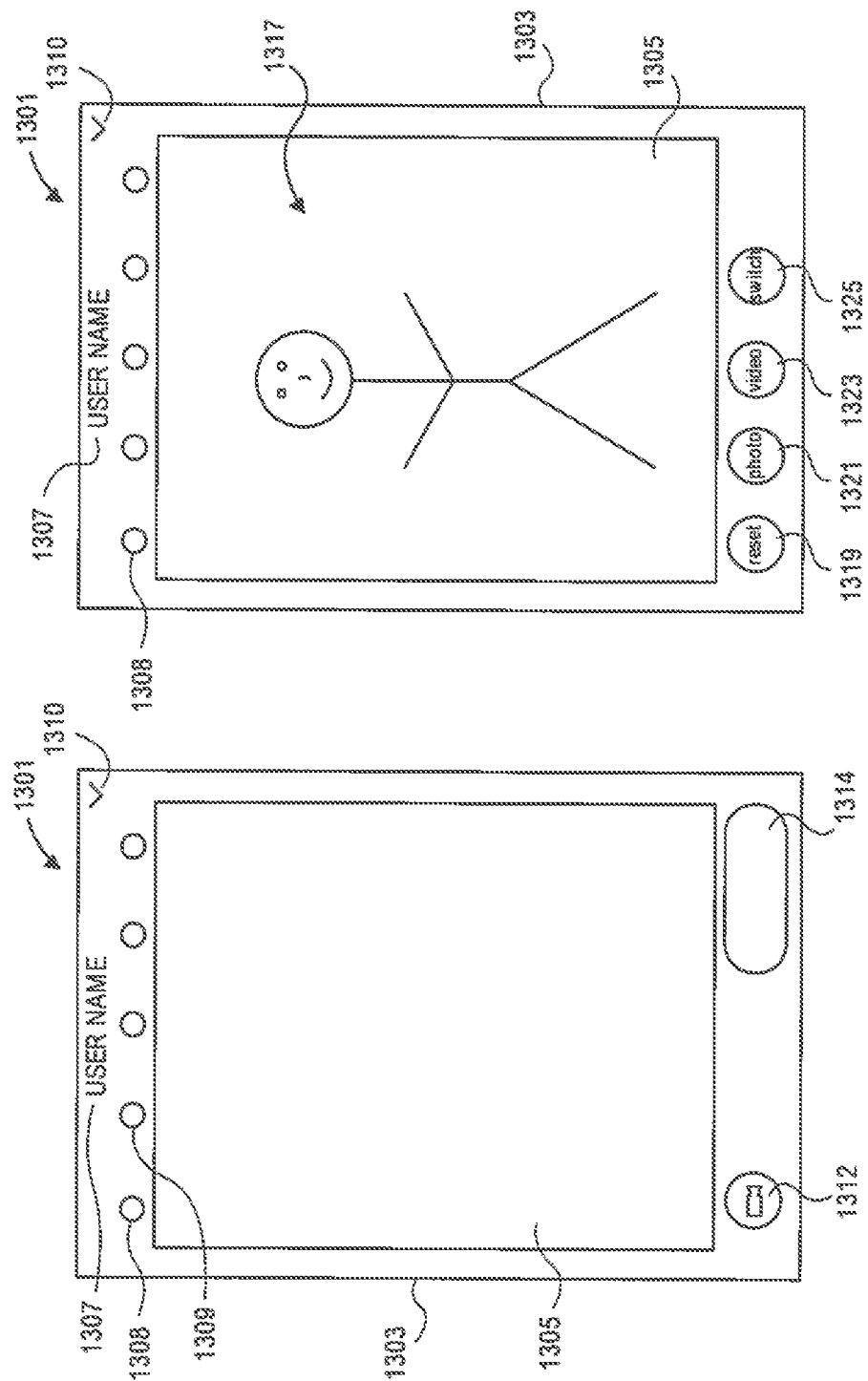

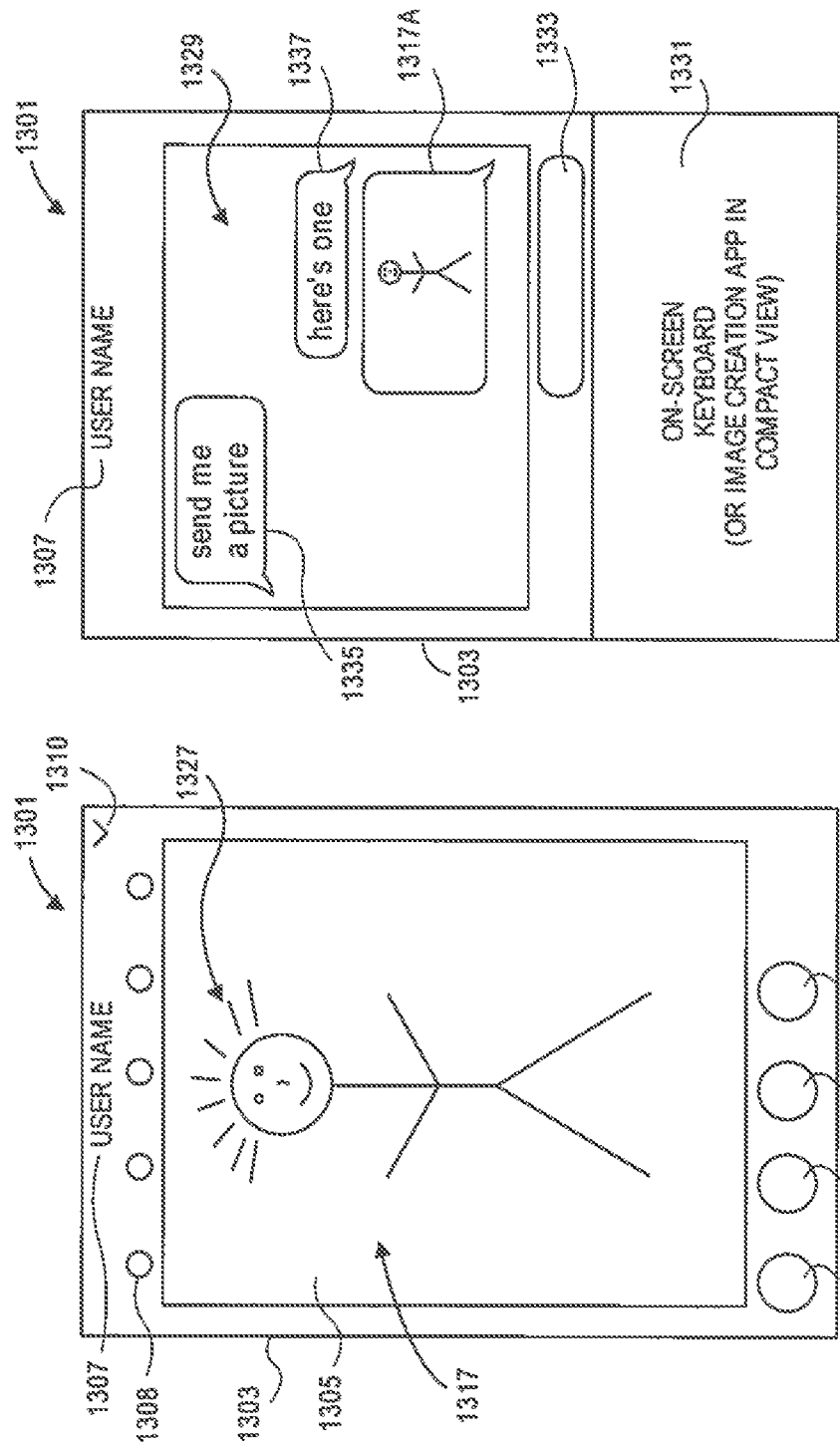

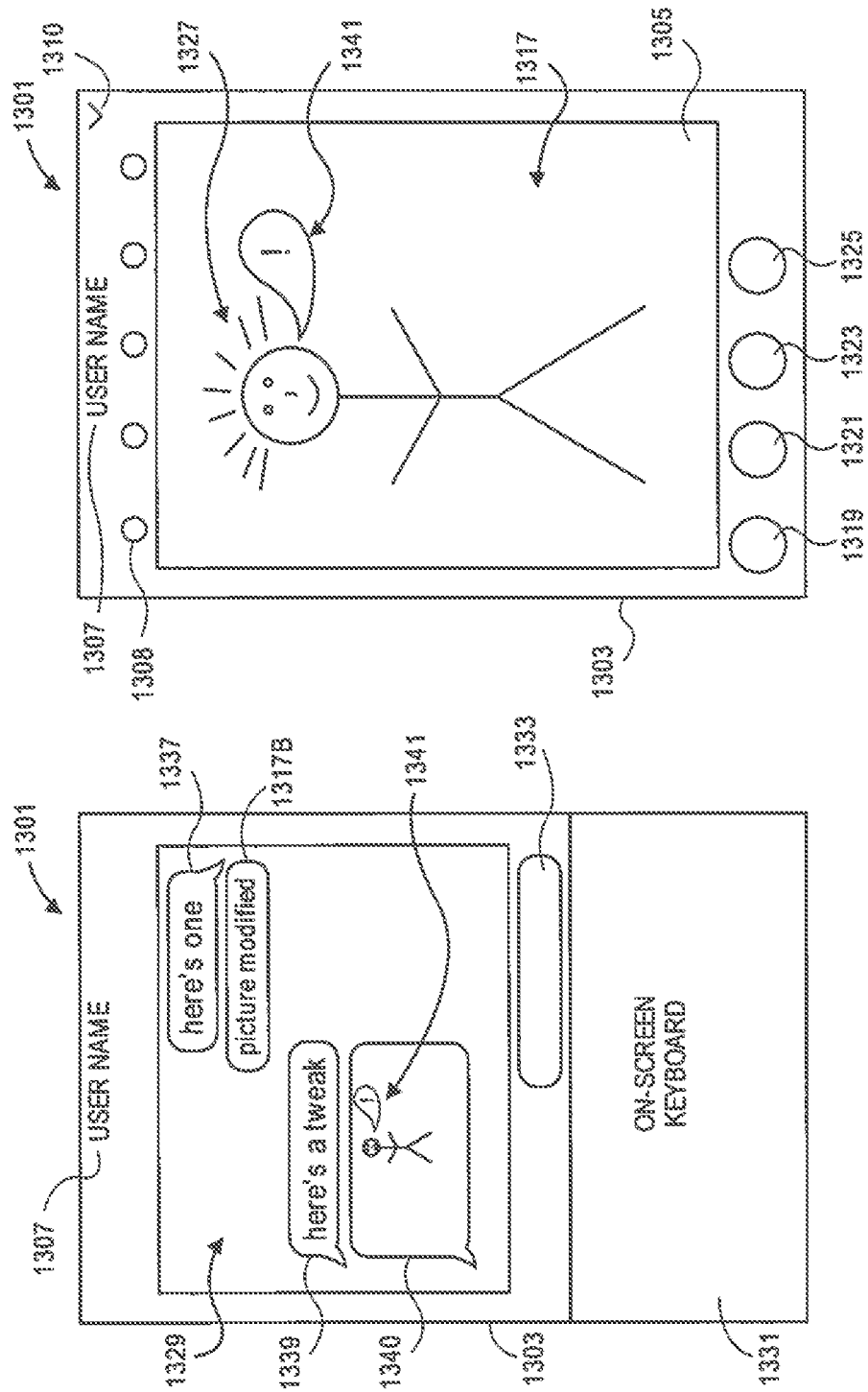

IMAGE CREATION APP IN MESSAGING APP

This application claims the benefit of U.S. Provisional Patent Application No. 62/349,087, filed on Jun. 12, 2016, which application is incorporated herein by reference. This application is also related to and claims the benefit of the following U.S. Provisional Patent Application Nos. (all of which are incorporated herein by reference): 62/349,101, filed Jun. 12, 2016; 62/349,113, filed Jun. 12, 2016; and 62/349,091, filed Jun. 12, 2016.

BACKGROUND

The embodiments described in this disclosure relate to messaging systems such as text messaging systems on cellular telephones or other communication devices or data processing systems.

The use of text messaging systems began many years ago. For example, wireless cellular telephone carriers, such as Verizon or AT&T, allowed text messages through the Short Message Service (SMS) for cell phones in the 1990s before smartphones were available. Typically, the amount of data transmitted has been limited by rules established by the carriers. Recently, as the use of swim/phones (e.g. iPhones) and tablet computers (e.g. iPad) has increased, the text messaging systems have developed the ability to send images, such as photos or emojis. In addition, messaging systems such as iMessage from Apple Inc, of Cupertino, Calif. have allowed users to also send and receive text and images through "public" networks which include "public" WiFi access points and the Internet (in addition to using the wireless carrier's private cellular telephone networks), and messaging systems such as Message can seamlessly transition between the use of public and private networks depending on the availability of, for example, WiFi access points or the compatibility of the other user's device (which may not be compatible with iMessage).

SUMMARY OF THE DESCRIPTION

An image creation app, which operates as an extension app or as a plug-in of a messaging app, allows a user to create images and then send the images using the messaging app. In one embodiment, the messaging app is configured to communicate messages, such as text messages, with other messaging apps which can include a second messaging app on a second device. The image creation app can accept user input to draw images (e.g. drawing lines, circles, etc. on a touch screen of the device which includes the image creation app) or to record images (such as still images or videos), and the created content can be applied to a specified message bubble in a message transcript and sent to another device, such as the second device which includes the second messaging app. This content can then be displayed on or adjacent to the specified message bubble and the user of the second device can respond by, for example, modifying the created image and sending back that modified image hack to the first device. In one embodiment, the image creation app can record images, such as a video and drawn images at the same time so that a video recording can have the drawn images overlaid on the recorded video.

A method according to one embodiment described herein can include the following operations: displaying a first messaging app on a first device, the first messaging app configured to communicate text messages with other messaging apps including a second messaging app on a second device through one or more messaging servers; receiving a command to display an image creation app within a view hosted by the first messaging app, the image creation app being either a plug-in of the first messaging app or an extension app of the first messaging app; displaying, in response to the command, a user interface of the image creation app within the view hosted by the first messaging app, the user interface configured to receive one or more user inputs to create one or more images drawn by a user of the image creation app. In one embodiment, the method can further include receiving the one or more user inputs on a drawing canvas within the view to create the one or more drawn images and storing the one or more drawn images; and receiving a command to send the one or more drawn images to the second messaging app which can operate in one embodiment with a counterpart image creation app on the second device. In one embodiment the method can also include sending the one or more drawn images to the second messaging app through one or more messaging servers. In one embodiment, the one or more messages can be sent in an encrypted form to the second messaging app. In one embodiment, the view which accepts the one or more user inputs in a screen area can be an area of the screen in which an on-screen keyboard of the first messaging app can also be displayed. In one embodiment, the command to display the image creation app can be one of: (a) the user's selection of an icon in a user interface of the first messaging app; or (b) the user's selection of a message bubble containing data sent by a messaging app. Wherein the data was created by either the image creation app or a counterpart image creation app on another device; or (c) the user's selection of an icon representing the image creation app in a view which displays installed messaging extension apps which have been installed for use with the messaging app on a device. In one embodiment the method can further include capturing one or more images by a camera on the first device, wherein the one or more captured images are displayed within a view hosted by the first messaging app; receiving the one or more drawn images as an overlay on the one or more captured images; generating data, such as vector graphics data, describing the one or more drawn images. In one embodiment, when the first messaging app sends the captured images and the drawn images, it can send them as two separate groups of data, one for the captured images and the other for the drawn images represented by the graphics data describing the one or more drawing images. This can allow the second device and second messaging app on the second device (if it is compatible with receiving this content in two groups) to recreate the drawn image using the data describing the drawn image and showing that as an overlay on the recorded images which can be either a video or a still image such as a photograph. In one embodiment, for older devices or older operating systems that do not support this feature of receiving two groups of content, the sending device can create a composited and compressed video from the data describing the images and the recorded video and transmit this composited and compressed video for delivery to the older devices.

In one embodiment, if the content is played back on the receiving device by the image creation app in an expanded view mode and the user of the receiving device responds immediately to the content, then the message (such as an edited version of the content created by the image creation app on the receiving device) is treated as a response in a session so that the resulting content, after the modifications made on the receiving device, are displayed in the same message bubble as the original message, and a bread crumb of the prior message bubble can be created and displayed within the message transcript.

The methods and systems described herein can be implemented by data processing systems, such as one or more smartphones, tablet computers, desktop computers, laptop computers, smart watches, audio accessories, and other data processing systems and other consumer electronic devices. The methods and systems described herein can also be implemented by one or more data processing systems which execute executable computer program instructions, stored in one or more non-transitory machine readable media that cause the one or more data processing, systems to perform the one or more methods described herein when the program instructions are executed. Thus, the embodiments described herein can include methods, data processing systems, and non-transitory machine readable media.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

FIGS. 9D, 9E, 9F, 9G, and 9H show an example of the message transcripts on two different devices that are involved in a conversation between two messaging apps, one on each device, wherein the conversation involves a session between two extension apps. The user interface shown in FIGS. 9D, 9E, 9F, 9G and 9H show how content in message bubbles created by the extension apps can be converted into breadcrumbs according to one or more embodiments described herein.

FIG. 18E shows an example of a user interface of an image creation app according to one embodiment.

FIG. 18B shows an example of the user interface of the image creation app of FIG. 18A after the user of the image creation app has captured one or more images using a camera on the device.

FIG. 18C shows an example of a user interface after the image creation app has received one or more user inputs to create a user drawn image overlaid on the captured image.

FIG. 18D shows the user interface of the messaging app after the image creation app was used to create content that was sent to another user in a conversation or chat.

FIG. 18E shows an example of a user interface of a messaging app on the device after the messaging app has received a response in the conversation from the other user, where the other user has modified the content created by the image creation app.

FIG. 18F shows an example of the image creation app which was invoked after receiving the modified content shown in FIG. 18E.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1A:
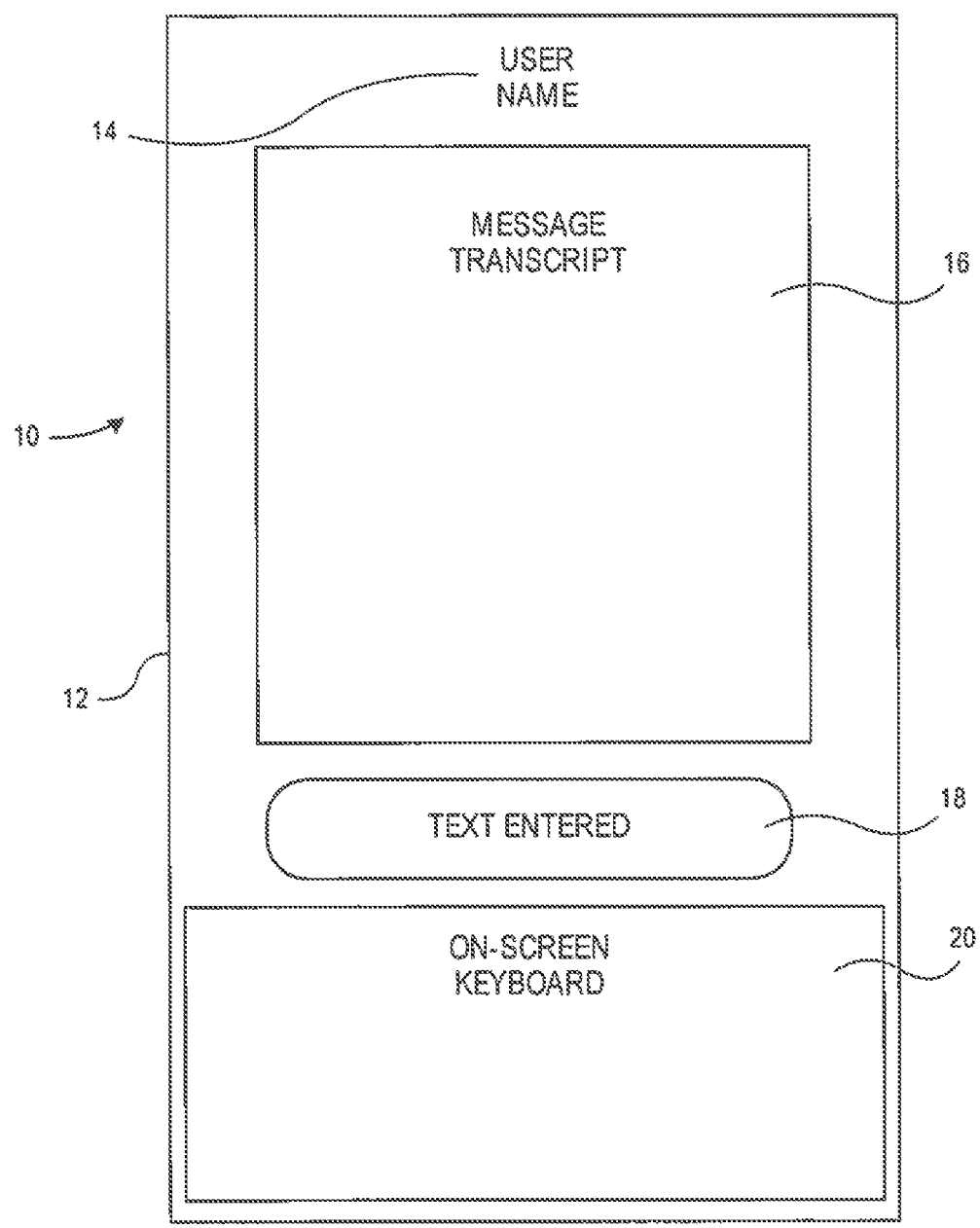
FIG. 1A shows an example of a user interface for a messaging app on a communication device.

The various embodiments described herein relate to messaging systems such as text messaging systems or "chat" messaging systems or other systems which allow devices to communicate messages between the devices. For example, iMessage from Apple Inc. of Cupertino, Calif. is an example of a messaging service for iOS devices and Mac (OS X) computers. Typically, a messaging system includes the plurality of client devices, each including at least one messaging app, and a set of one or more messaging servers that can receive messages from client devices and transmit messages to client devices. FIG. 1A shows an example of a user interface of a messaging app on a client device. The client device can be a communication device 10 which can be a smartphone, or tablet computer, or a desktop computer or a laptop computer, wearable, on-board computer, or other data processing systems or other consumer electronics devices. In one embodiment, the device can include a conventional touch screen that can both display images and also accept touch inputs from a user. The touch screen 12 on the communication device can display the user interface of the messaging app which can include a message transcript 16 and an on-screen keyboard 20 below the message transcript 16. In addition, the user interface of the messaging app can include a user name 14 indicating the recipient, in one embodiment, of messages sent from the communication device 10. In addition, the user interface can include a text entry region 18 which indicates the content of the text entered by the user before it is sent; in a sense, the text entry region 18 is a text staging area indicating text that is ready to be sent to the recipient.

Figure 1B:
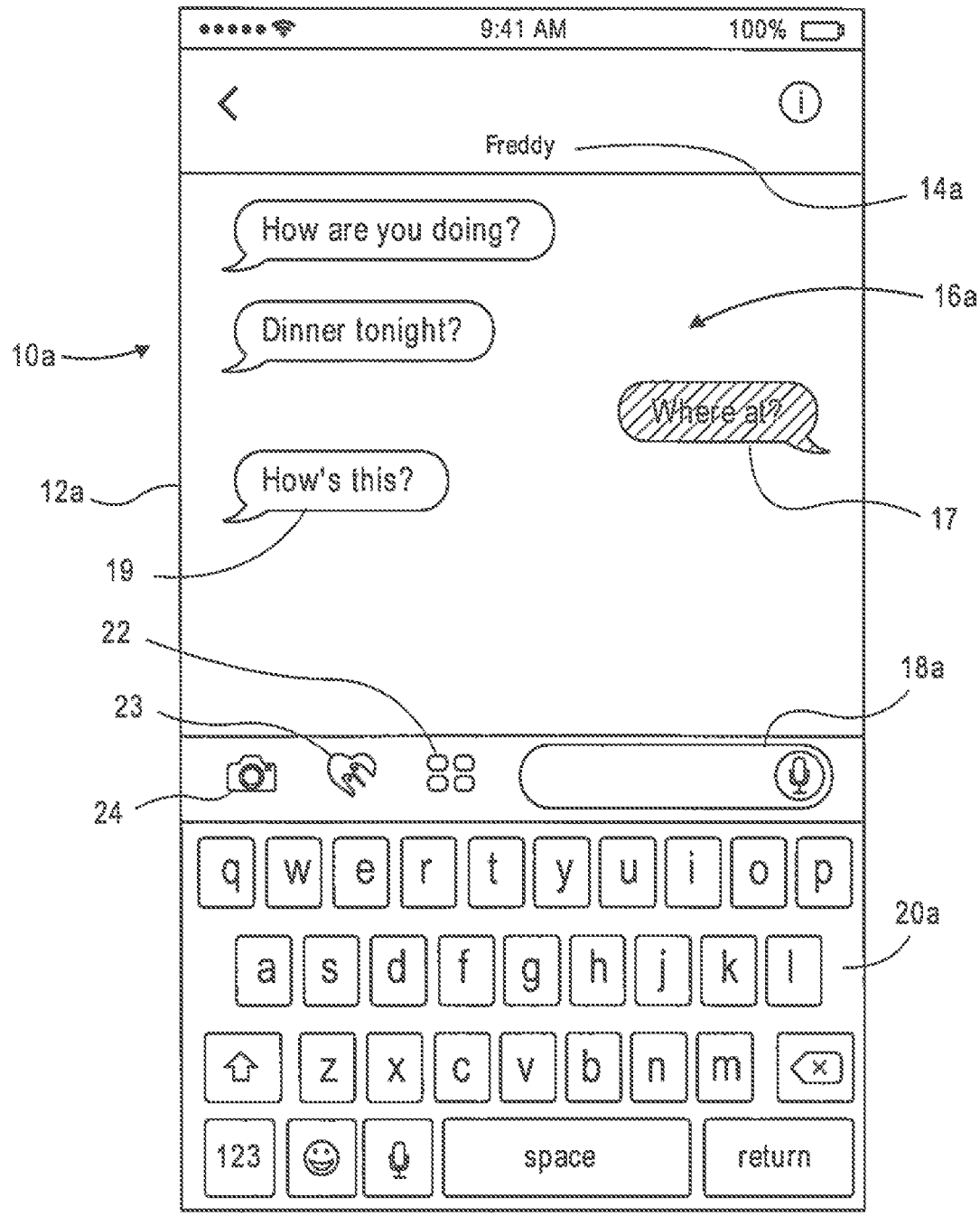
FIG. 1B shows another example of a user interface for a messaging app on a communication device.

FIG. 1 shows a more detailed example of a user interface of a messaging app on a communication device 10A. The user interface is displayed in this embodiment on touch screen 12A and includes on-screen keyboard 20A, text entry region 18A, a message transcript 16A and a user name 14A showing the name of the other user(s) to whom messages are sent and from whom messages are received. The text entry region 18A is a staging area for content such as one or more of text, stickers, extension app content, images etc. which are ready to be sent in response to the user's selection of the send command (and in one embodiment, the content can be edited in the staging area). In the example shown in FIG. 1B, messages from Freddy (user name 14A) are shown on the left side of the message transcript 16A and messages sent by the user of communication device 10A are shown on the right side of message transcript 16A. Hence, message bubble 17 shows the message "Where at?" sent by the user of communication device 10A to Freddy as a response to the message from Freddy "Dinner tonight?". The message in message bubble 17 causes Freddy to respond with "How's this?" shown in message bubble 19. The use of the word "bubble", such as message bubble or session bubble, etc. is not meant to imply any specific shape or form; rather it is intended to mean any shape or form of demarcation between messages between two or more participants, and thus the demarcation can use boxes or lines or message containers or different colors, etc. Thus the phrase "message bubble" is meant to cover all such demarcations (or other ways to distinguish) between messages between two or more participants, and particularly in the context of such demarcations or other ways to distinguish in a message transcript. In one embodiment, the message transcript can be scrolled up and down and messages in the message transcript are presented in sequence according to their time, thus the user can see the actual chat or conversation over time by scrolling the view up or down. The user interface shown in FIG. 1B also includes three icons 22, 23, and 24 above the on-screen keyboard 20A and to the left of the text entry region 18A. The extension apps view icon 22, when selected, causes the display of a view of the installed extensions app that can operate with the messaging app, and the view provided can be a browsable view, such as the browsable view 157 shown in FIG. 48 to allow the user to scroll through multiple pages showing all of the installed extension apps that are configured to operate with the messaging app according to the one or more embodiments described herein. The imaging app icon 23 can in one embodiment be an icon that when selected causes the launching of a plugin of the messaging app that provides image creation within the messaging app's process such as the plugin shown in FIGS. 5A, 5B, and 5C. The camera app icon 24 in one embodiment can, when selected, cause the communication device 10A to enter into a camera mode in which a camera of a device can capture still images or video images which can be placed into the message in order to send the image or video.

Figure 2:
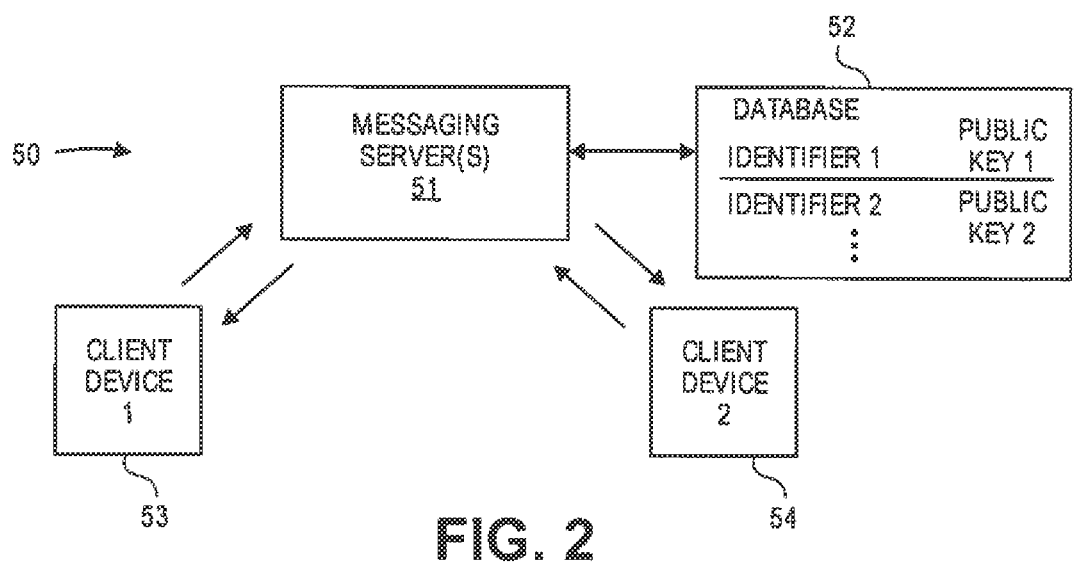
FIG. 2 shows an example of a messaging system which employs one or more messaging servers to provide a messaging service to a set of client devices.

A brief overview of an example of a messaging system will now be provided in conjunction with FIG. 2. A messaging system 50 can include a plurality of client devices, such as client devices 53 and 54. Each of these client devices can include at least one messaging app that is configured to operate with extension apps according to the one or more embodiments described herein and also communicate at least text messages and optionally resource locators or images or other content (e.g. as described relative to FIG. 13A) for devices that are not compatible with the extension app architecture in a messaging app. In a typical messaging system, there can be millions of client devices communicating through a set of messaging servers. In one embodiment, a plurality of messaging servers can be configured to receive encrypted messages from sending devices and then transmit those encrypted messages to the receiving devices. Another set of servers can be configured to receive non-text content, such as images or other "attachments" and provide those images or attachments in download operations to receiving devices in response to requests from those receiving devices to obtain the images or attachments. In one embodiment, a sender's outgoing message is individually encrypted for each of the receiver's devices. In one embodiment, an asymmetric RSA encryption algorithm can be used to perform the encryption. In one embodiment, the public RSA encryption keys of each of the receiving devices can be retrieved from a directory service (maintained by the one or more messaging servers) which includes a database, such as a database 52 which is coupled to the one or more messaging servers 51. When a client device, such as client device 53 seeks to send a message to another client device, it identifies the other client device (such as by an email address or a telephone number or other identifier) to the one or more messaging servers 51. That identifier is sent from the client device, such as client device 53 to one or more messaging servers 51 which then perform a lookup operation in the database 52 based upon the supplied identifier to retrieve the public key that corresponds to that identifier. That public key is then transmitted back to the client device which requested the public key for that particular receiving device, and then the client device can encrypt the message using the public key or using another key (e.g. a symmetric key) which can be randomly generated, and that other key is encrypted with the public RSA encryption key for the particular receiving device. In one embodiment, the randomly generated key can be randomly generated on a per message basis. In one embodiment, the resulting messages, one for each receiving device, consists of the encrypted message text, the encrypted message key, and the sender's digital signature, and this resulting message for each receiving device is then uploaded to the one or more messaging servers 51 for delivery to the recipient client devices, such as client device 54. In one embodiment, the messaging system 50 can be configured to operate through "public" networks which include public WiFi access points (such as WiFi access points in coffee shops, airports, etc) and also the Internet. The messaging apps on each of the client devices 53 and 54 can also be configured to operate with the "private" networks provided by wireless cellular telephone carriers, such as Verizon and AT&T, and the messaging apps can be configured to seamlessly switch between the use of the private and public networks depending upon the availability of each and also depending upon the compatibility of each of the client devices in a messaging session. In one embodiment, the messaging servers 51 can include a set of push notification servers which receive the uploaded text messages and which "push" those text messages to receiving devices.

A messaging system in one embodiment on a client device includes a messaging app and one or more extension apps that each operate as separate processes. In one embodiment, the message app and the one or more extension apps can each be separate sandboxed processes that operate or execute in their own memory spaces. In addition, the messaging app can also operate with plug-ins, such as an image creation plug-in shown in FIG. 5A, which operate within the same process and memory space as the messaging app. The messaging app and each extension app communicate with each other through an interprocess communication, such as the XPC framework provided in iOS and Mac OS X. The messaging app is designed to receive text on a sending device from a user of the device and display the text in a message transcript and send the text, through a set of one or more messaging servers, to a receiving device which displays, through a counterpart messaging application on the receiving device, the received text in a message transcript on the receiving device. The receiving device and the sending device can each have a copy of the same extension app which are configured to create content of a certain type depending upon the particular extension app (or, in an alternative embodiment, each can include a copy of different extension apps that are compatible for the content used by them).

Figure 3A:
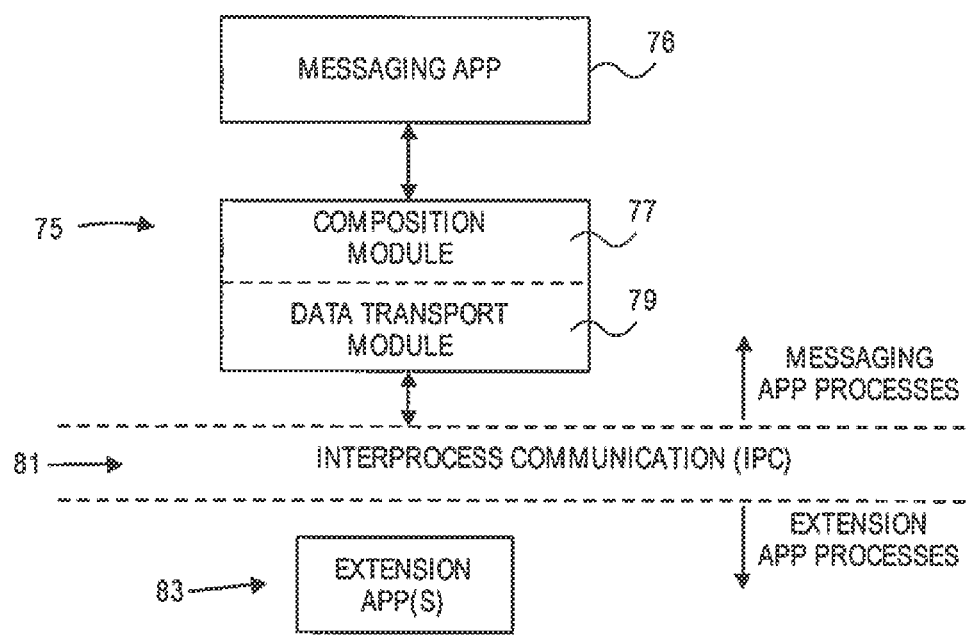
FIG. 3A shows a block diagram of an architecture for providing extension apps for use with a messaging app according to one embodiment.

FIG. 3A shows an example of a software architecture in which a messaging app and one or more extension apps operate together to provide an enhanced messaging system. As shown in FIG. 3A, the messaging system 75 includes a messaging app 76 and a set of plug-in modules, such as a composition module 77 and a data transport module 79 which are configured to communicate through an interprocess communication (IPC) 81 with the one or more extension apps 83. As shown in FIG. 3A, the messaging app and the composition module 77 and the data transport module 79 operate within the messaging app processes in a memory space controlled by a kernel on the communication device which executes the messaging system 75. The composition module 77 composes the content of a message bubble when the message bubble displays or otherwise presents content passed to the messaging app through the IPC 81. The data transport module 79 passes the content and other data to the extension app through the IPC 81 and receives the content and other data from the extension app through the IPC 81. Both modules 77 and 79 in one embodiment can have an extendable plug-in architecture that allows the addition of new plug-ins for new extension apps that generate new content or require a new data transport process. In this context, the plug-ins are additional software that operate within the same process as the messaging app. The composition module 77 can use a template to construct a message bubble such as the "MSMessageTemplateLayout" described below relative to FIG. 3C. The kernel can include a software library or software framework for providing the IPC 81 to allow communication between the messaging system 75 and the one or more extension apps 83. In one embodiment, the IPC framework can include a system area that is referred to as an extension point which provides APIs to allow for communication between the two different processes and to reinforce policies in terms of the types of communications which are permissible. In one embodiment, the communication through IPC involves the placement (writing) of content in a memory region by one process and the IPC framework allows another process to read from that memory region. In one embodiment, the messaging app 76 can launch automatically the extension app processes and can manage their lifetime, including the termination of those processes. In one embodiment, each of the extension apps 83 run in their own address space communication between the extension and the messaging app uses the IPC mediated by the system framework and they do not have access to each other's files or memory spaces. In one embodiment, each of the extension apps may be a sandboxed process which are separate from each other and the messaging app 76 can also be a separate sandboxed process which is separate from the sandboxed processes of the extension apps. Moreover, the extension apps can be provided with fewer system permissions relative to the messaging app so that the extension apps operate in a more restricted environment than the messaging app. Further information in connection with the use of interprocess communications for extensions can be found in U.S. patent application Ser. No. 14/488,122, filed Sep. 16, 2014 and published as U.S. Publication No. U.S. 2015/0347748, which application is incorporated herein by reference.

Figure 3B:
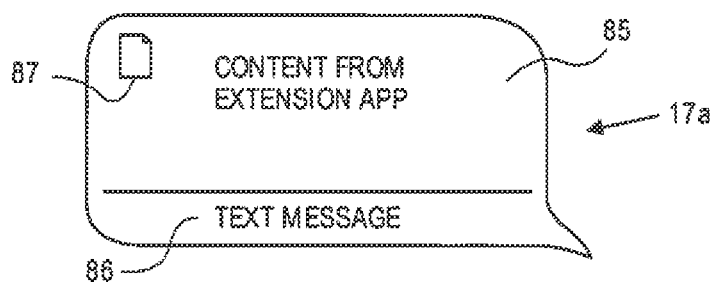
FIG. 3B shows an example of a user interface of a message bubble created at least in part by an extension app according to one embodiment herein.

In one embodiment the messaging app provides a view of content obtained from the extension app through the interprocess communication. The extension app can create the content in its own process and then provide that content in formats known to be acceptable to die messaging app (such as standard image formats or other standard formats). This allows the messaging app to then present the content from the extension app within one or more message bubbles within a message transcript (without needing to execute the extension app at least on the receiving device). FIG. 3B shows an example of a message bubble 17A which contains content created by and provided from an extension app, shown as content 85 which also can include a text message created by or provided by the extension app, such as text message 86. In one embodiment, the message bubble 17A can also include an icon 87 which can be the icon of the extension app which created the content 85.

Objects created by an extension app in one embodiment are shown in the message transcript on sending and receiving devices without launching the extension app. The extension app should provide enough information to construct a message bubble as part of the object. The object can consist of some opaque data encoded in a resource locator and a layout specification provided as a MSMessageTemplateLayout object. MSMessageTemplateLayout is a subclass of MSMessageLayout and represents one method of specifying message bubble layout.

Figure 3C:
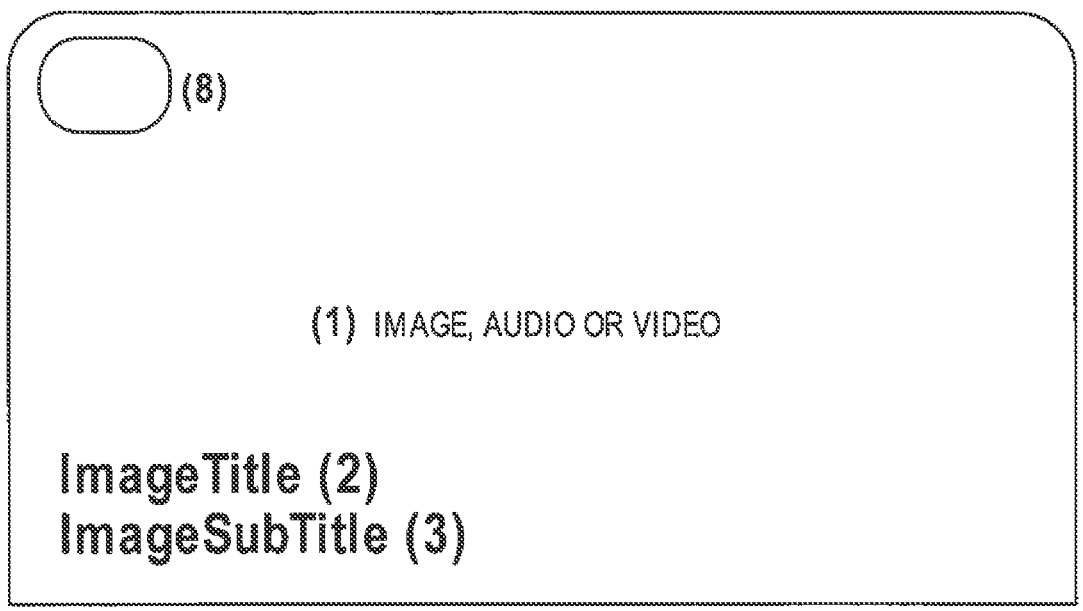
FIG. 3C shows an example of parts of a message bubble based on a template.

MSMessageTemplateLayout can have the following properties in one embodiment which are shown in FIG. 3C:

1) image or mediaFileURL: An image provide as a UIImage or as a file URL to an image file or a file URL to a video 2) imageTitle A string the will be rendered on top of the image or movie 3) imageSubTitle A string the will be rendered on top of the image or movie below the imageTitle 4) caption A string the will be rendered in a caption bar below the image or movie 5) trailingCaption A string the will be rendered right aligned in a caption bar below the image or movie 6) subCaption: A string the will be rendered in a caption bar below the caption 7) trailingSubCaption A string the will be rendered right aligned in a caption bar below the trailingCaption 8) Extension icon: This is not provided as part of the MSMessageTemplateLayout but is derived from the bundle identifier of the extension that created the MSMessage.

The messaging app can use this information to construct the message bubble similar to the example shown in FIG. 3C.

The MSMessageTemplateLayout is serialized and transferred to the remote devices along with the opaque data. On receipt the messaging app on the receiving device will create a MSMessageTemplateLayout using the serialized data and use this to draw the message bubble in the receiver's message transcript.

In one embodiment, the extension apps which are configured to operate with a messaging app are not executable outside of the messaging application, and thus their life cycle is managed entirely by the messaging app. Moreover, as further described below, the downloading and installing of the extension apps can be controlled exclusively by the messaging app in one embodiment.

Figure 4A:
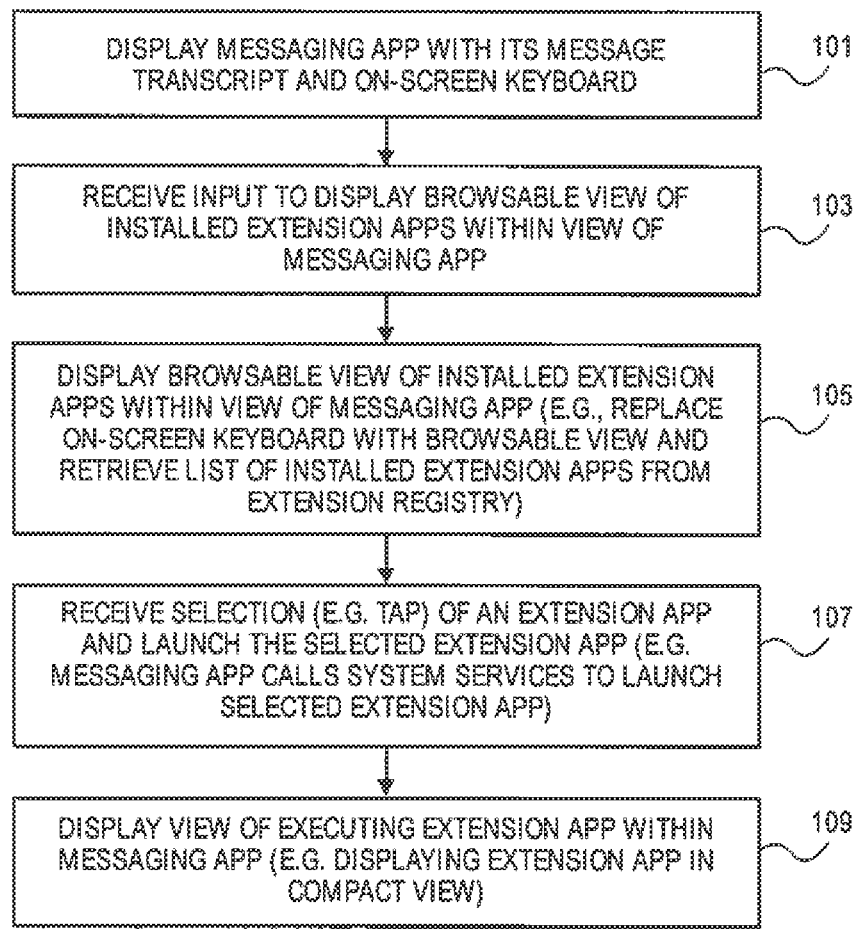
FIG. 4A is a flowchart which shows a method according to one embodiment for browsing, selecting, and launching an extension app from within a messaging app according to one or more embodiments described herein.
Figure 4B:
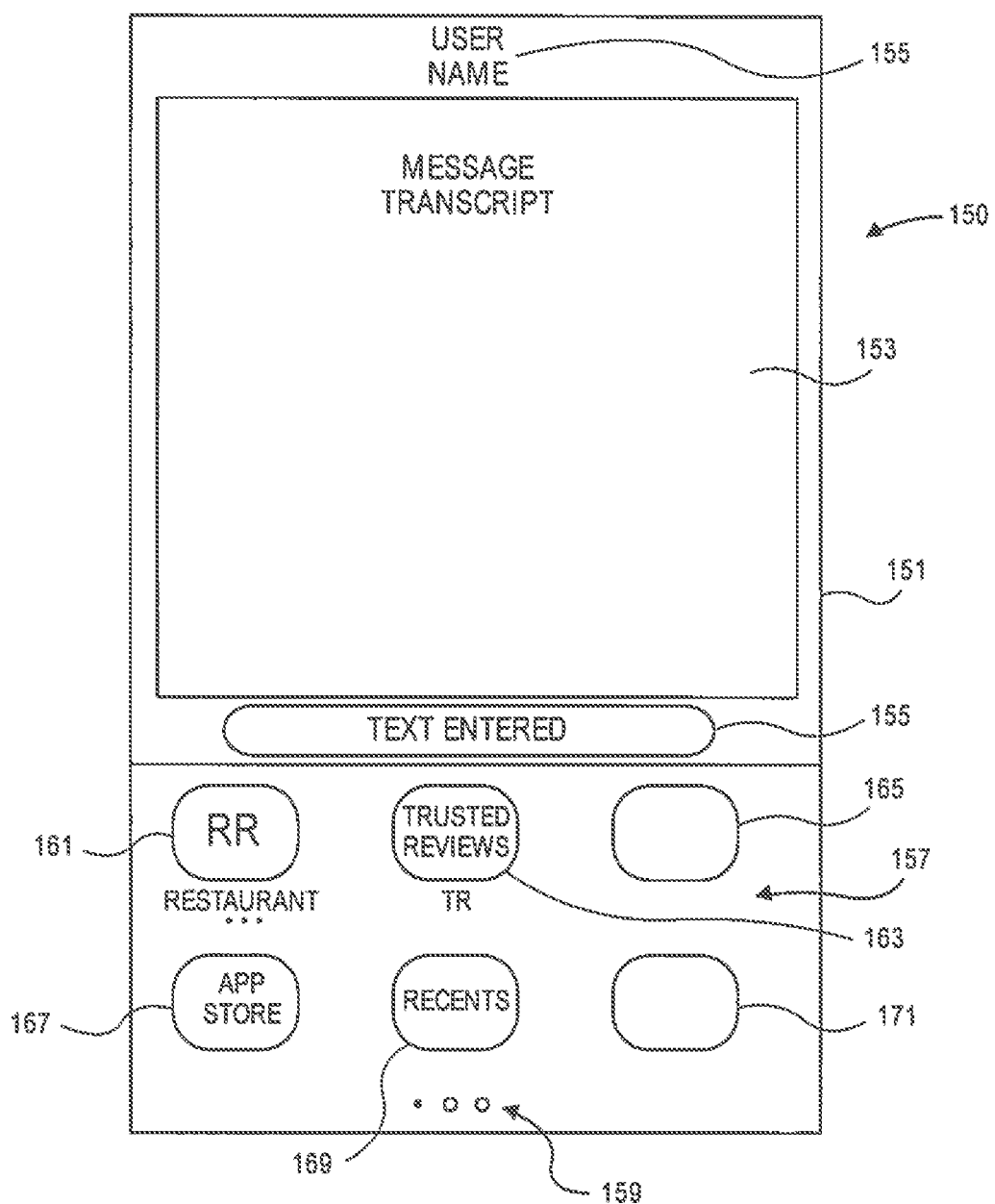
FIG. 4B shows an example of a user interface for a messaging app which includes a browsable view of installed extension apps according to one embodiment described herein.

In one embodiment, each extension app can be obtained from an app marketplace or distribution facility such as the Apple App Store (trademark) for message extension apps and can be launched from within the messaging app. FIG. 4A shows an example of a method according to one embodiment in which the installed extension apps can be browsed from within the messaging app, and a particular extension app can be launched to allow the user to interact with a particular extension app. The method can begin in operation 101 in which the messaging app displays its message transcript and an on-screen keyboard. FIG. 1B shows an example of a user interface of such a messaging app. Then in operation 103, the messaging app can receive an input to display a browsable view of installed extension apps within a view of the messaging app. For example, a user may tap on the icon 22 (in FIG. 1B) to select the icon which in turn causes the display of the browsable view in operation 105. In one embodiment, the browsable view of installed extension apps takes the place of the on-screen keyboard and retrieves the list of the installed extension apps from an extension registry which causes the display of icons for each of the installed extension apps. FIG. 4B shows an example of the result of operation 105 in which a browsable view 157 is displayed and takes the place of the on-screen keyboard of the messaging app as shown in FIG. 4B.

Figure 14A:
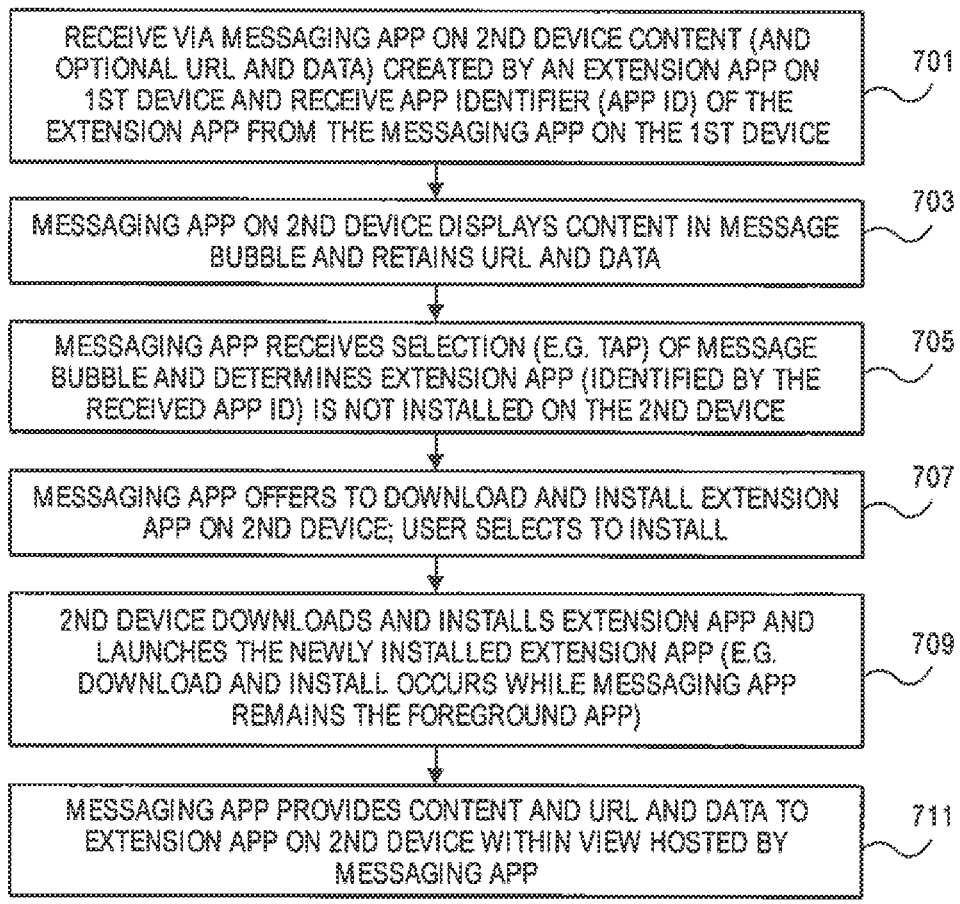
FIG. 14A shows a method according to one embodiment in Which a receiving device (which has received a message) downloads and installs an extension app required to view or interact with the content in one of the messages.
Figure 14B:
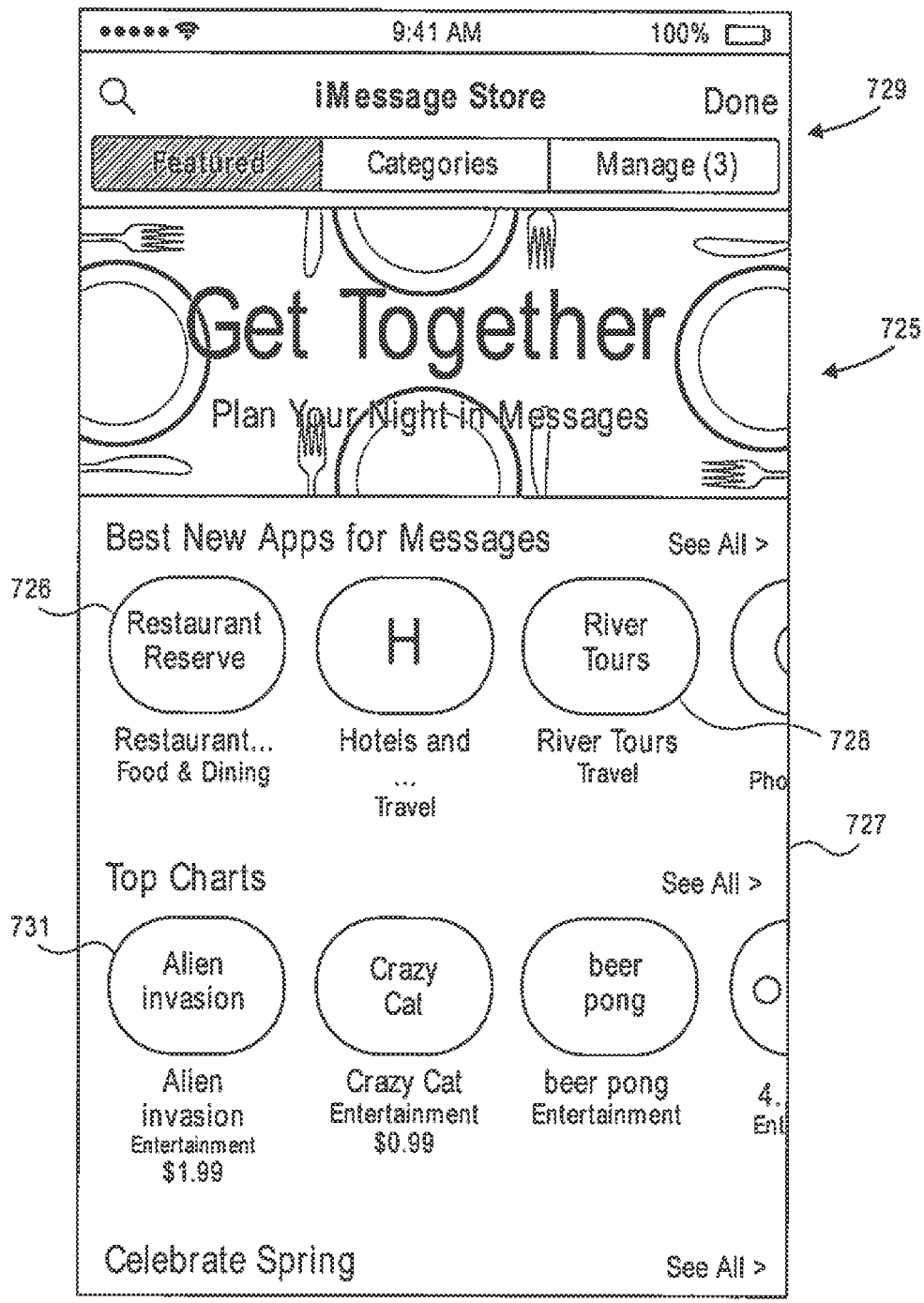
FIG. 14B shows an example of a user interface of an extension app marketplace or service from which extension apps can be downloaded and installed.

Referring to FIG. 4B, it can be seen that the browsable view 157 includes a plurality of icons each representing one of the installed extension apps that can operate with the messaging app that provides the user interface shown in FIG. 4B. The user interface of the messaging app shown in FIG. 4B includes a message transcript 153 shown in the upper portion of the touch screen 151 on the communication device 150 which executes the messaging app. A user name 155 of the other user (recipient of messages sent from communication device 150) is shown at the top of the user interface of the messaging app. A text entry region 155 (which shows text or other content that is staged or ready to be sent) is displayed between the message transcript 153 and the browsable view 157. In one embodiment, the browsable view is browsable by swiping the user's linger across the touch screen to cause the pages in the various views of installed extension apps to be displayed (and in one embodiment, can also show, for example, uninstalled extension apps that either need to complete a download process or need to complete an install process). In one embodiment, a page indicator 159 at the bottom of the user interface can show the current page of installed extension apps. In one embodiment, one of the icons can be reserved to launch or enter the extension app marketplace, an example of which is shown in FIG. 14B. In another embodiment the extension app marketplace can be displayed in the browsable view 157 in response to selecting icon 167. In the embodiment shown in FIG. 4B, the icon 167 is the extension app marketplace icon which can be selected to cause the presentation of the extension app marketplace, such as the extension app marketplace shown in FIG. 14B. In the embodiment shown in FIG. 4B, the icon 169 can be selected (e.g. user taps icon 169) to cause the display in the browsable view of recently sent stickers or handwritten messages or other recently sent items or recently used apps, etc. The display of recently sent items, etc. can in one embodiment be provided by a plug-in operating within the messaging app's process. Other extension apps include a restaurant reservation app icon 161 which can be an extension app that can be used to engage a restaurant reservation service, such as Open Table. Another example of an extension app is represented by icon 163 which when selected launches a restaurant review app which provides reviews of restaurants and which can be similar to the reviews provided by Yelp, for example. The other extension app icons 165 and 171 represent other extension apps which are installed and which can be launched by selecting one of those extension app icons.

Referring back to FIG. 4A, once the browsable view is displayed by operation 105, the user can select one of the extension apps by selecting the corresponding icon which in turn causes the launching of the selected extension app in operation 107. In one embodiment, the messaging app calls a system service to launch the selected extension app and prepare it for execution as an extension of the messaging app using the architecture shown, for example, in FIG. 3A. Once the selected extension app has been launched and is executing, the messaging app, such as messaging app 76 can host the view of the content provided by the executing extension app through the IPC framework as described herein. For example, in operation 109 shown in FIG. 4A, the messaging app can display a view of the content provided by the extension app within a portion of the view of the messaging app. FIGS. 5A through 5F will now be described as examples of how the messaging app hosts the view of the content of the executing extension app.

Figure 5A:
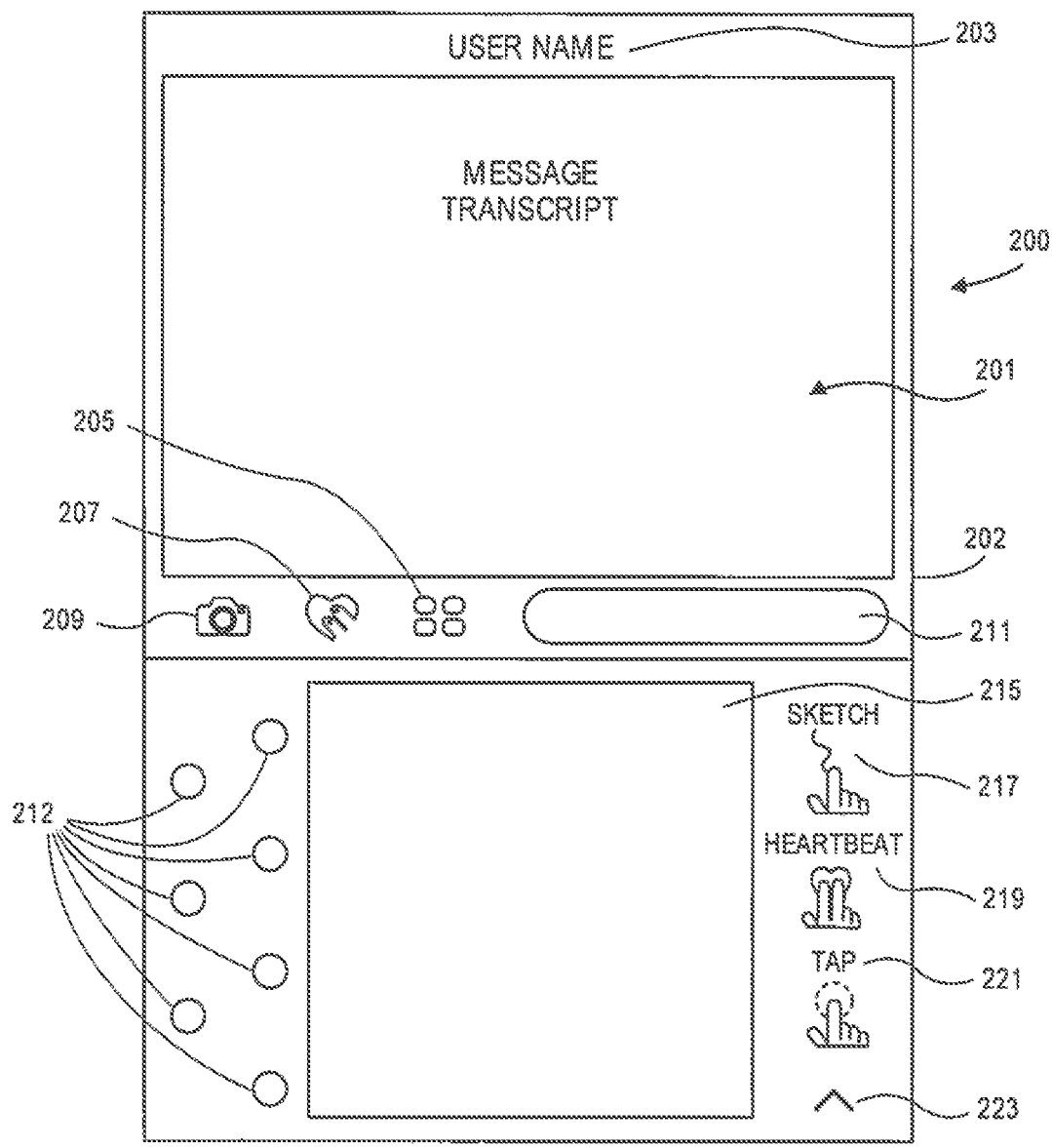
FIG. 5A shows an example of a user interface of a messaging app which includes a view of an extension app within the user interface of the messaging app.
Figure 5B:
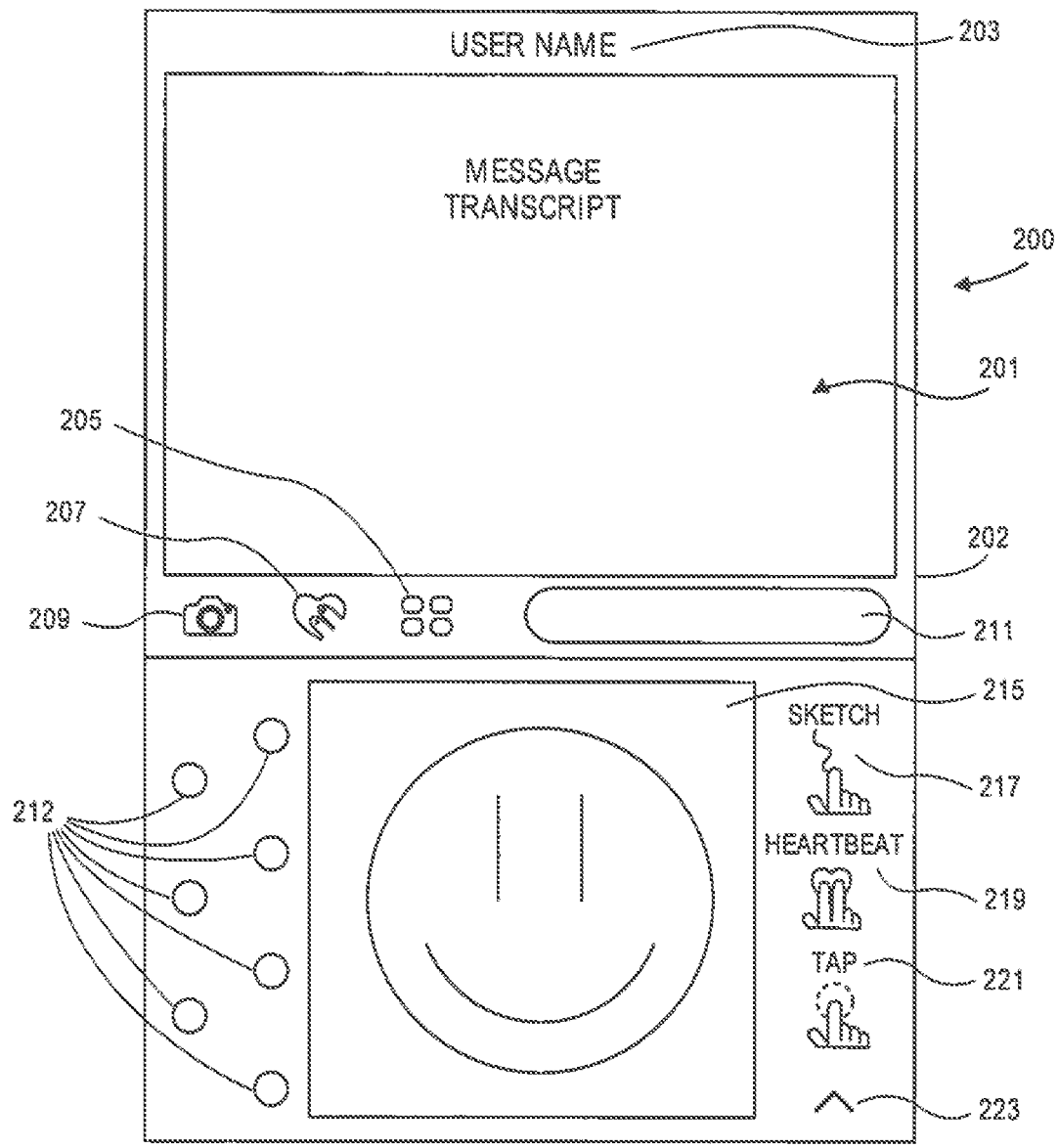
FIG. 5B shows an example of a user interface of an extension app, after the user has created content in the extension app, wherein the view of the extension app is hosted within the user interface of the messaging app.
Figure 5C:
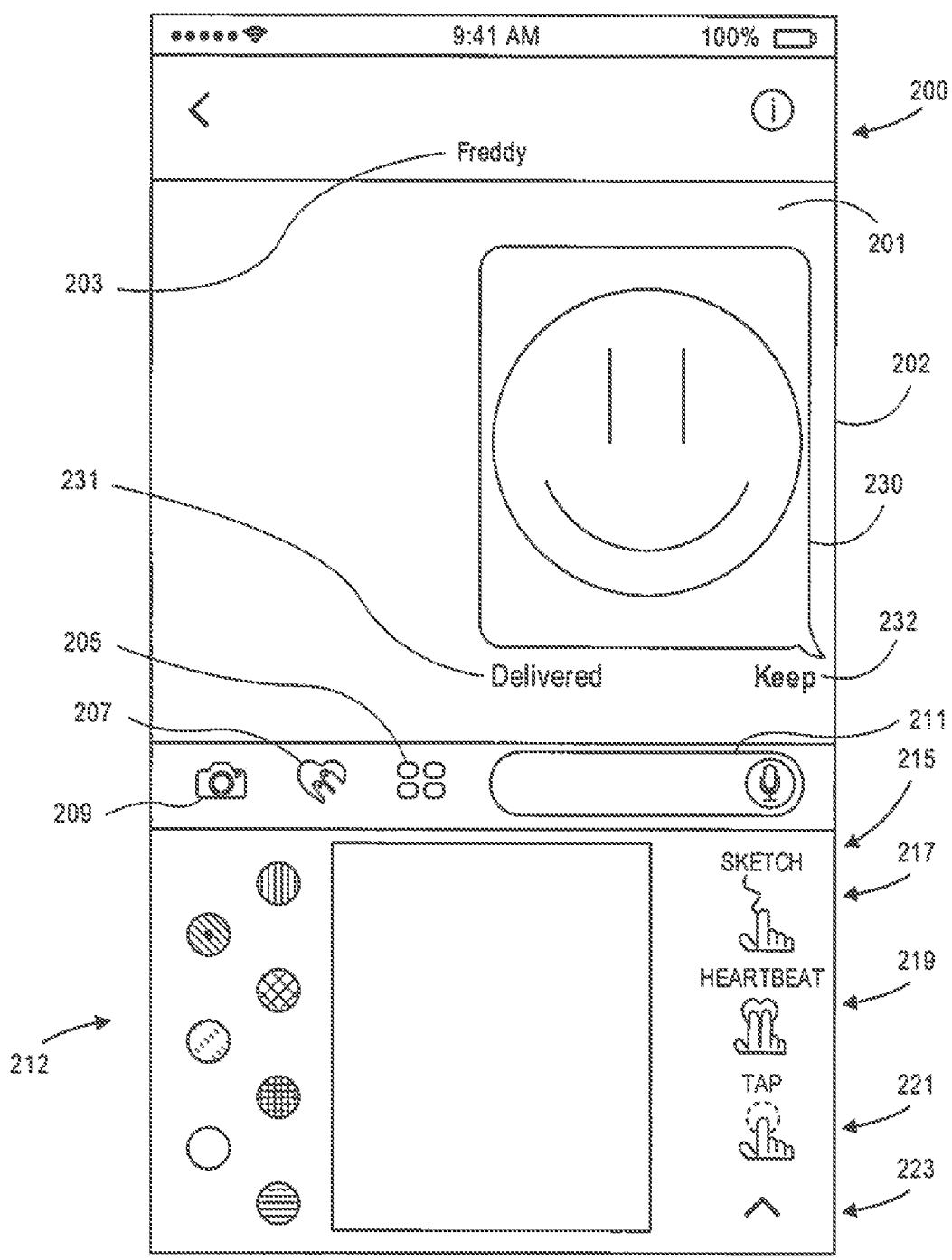
FIG. 5C shows an example of a user interface of a messaging app on a communication device after the user has created content using an extension app and has sent the content by using the messaging app to send the content.

FIG. 5A shows an example of a messaging app that hosts a view of a plug-in of a messaging app that is an image creation app launched by selecting the icon 207 (e.g. icon 207 is touched or tapped or otherwise selected by a user). In another embodiment, the plug-in shown in the bottom portion of the user interface shown in FIG. 5A may be launched by selecting one of the icons in the browsable view 157 shown in FIG. 4B. While the example shown in FIG. 5A can be implemented as a plug-in of the messaging app, in another embodiment, the example shown in FIG. 5A can be an extension app. In the example shown in FIG. 5A, the view of the plug-in (or extension app) has taken the place of the on-screen keyboard of the messaging app, but the message transcript of the messaging app is still viewable and displayed in the user interface, allowing the user to scroll through the message transcript in one embodiment to see the entire transcript. In another embodiment, the view of the plug-in or extension app is an overlay on top of the on-screen keyboard, a portion of which may be viewable. The transcript is displayed on the touchscreen 202 in one embodiment on the communication device 200. The user interface of the message app also includes the user name 203 which presents in one embodiment the name of the other user in the conversation or chat. The user interface of the message app also includes the text entry region 211 which is similar to the text entry region 18A and the text entry region 155. The plug-in (or extension app) includes a drawing canvas 215 and various controls and options which can be selected by the user to draw or create images. Drawing controls 212 in one embodiment can allow the users to select different colors to sketch on the drawing canvas if the sketch option 217 is selected. The plug-in (or extension app) can also provide taps as a message if the tap option 221 is selected. The plug-in (or extension app) can also provide heartbeats if the heartbeat option 219 is selected. In one embodiment, the sketch, heartbeat, and taps can be similar to the sketch, heartbeat and taps on the Digital Touch application which is available on the Apple Watch. The plug-in (or extension app) also includes an expanded view icon 223 which when selected can cause the plug-in (or extension app) to switch from its current compact view shown in FIG. 5A to an expanded view, such as the expanded view shown in FIG. 7B. In the example shown in FIG. 5A, the user has just launched the plug-in image creation app (or an extension app in the alternative embodiment) and has not yet created any content. This can be contrasted with the state of the plug-in (or extension app) shown in FIG. 5B in which the user has created a happy face sketch by using the sketch option 217 and by drawing on the drawing canvas 215 with, for example, the user's finger. The user can then cause the drawing to be sent to the other user (or users) who would be recipients for the message. Thus for example, the user of the device 200 can select a send command from within the messaging app executing on communication device 200 to cause the content created by the plug-in (or extension app) to be sent to the recipients. The result of the sending operation is shown in FIG. 5C in which the happy face has been sent to Freddy as indicated by the user name 203. The message bubble 230 shows the happy face sketch that was created by the plug-in (or extension app); in the case of the extension app, this created content was communicated from the extension app through the IPC frame work to the messaging app and then presented within the message bubble 230 to show that the message containing that content was transmitted to one or more recipients. In one embodiment, a delivery indicator 231 can indicate that the message was delivered and a keep control 232 can be provided to the user to allow the user to retain the content in the message transcript in those embodiments in which the content can be automatically eliminated after a period of time.

Figure 5D:
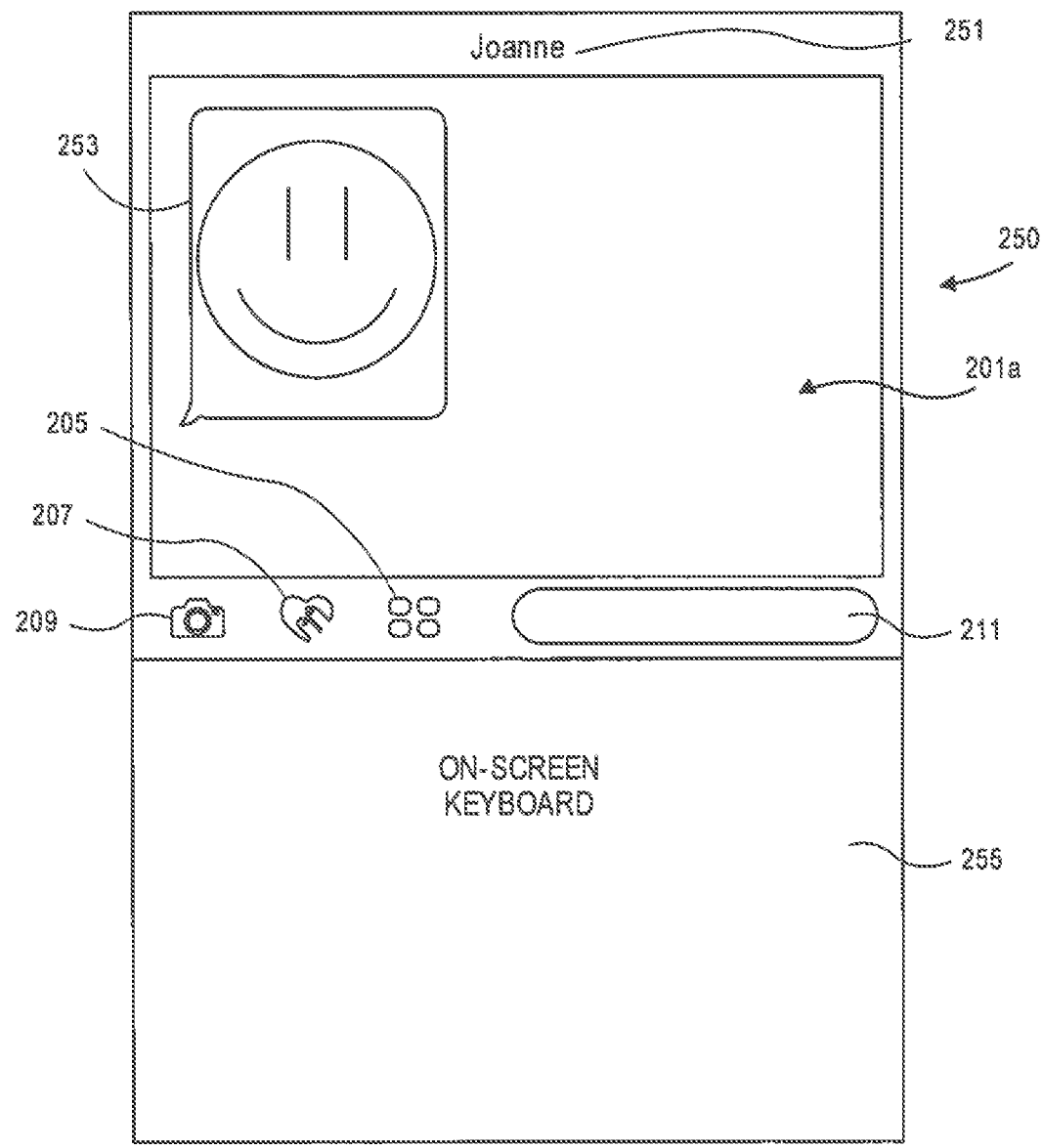
FIG. 5D shows an example of a user interface in a messaging app on a receiving device after the receiving device receives content created by an extension app on the sending device.
Figure 5E:
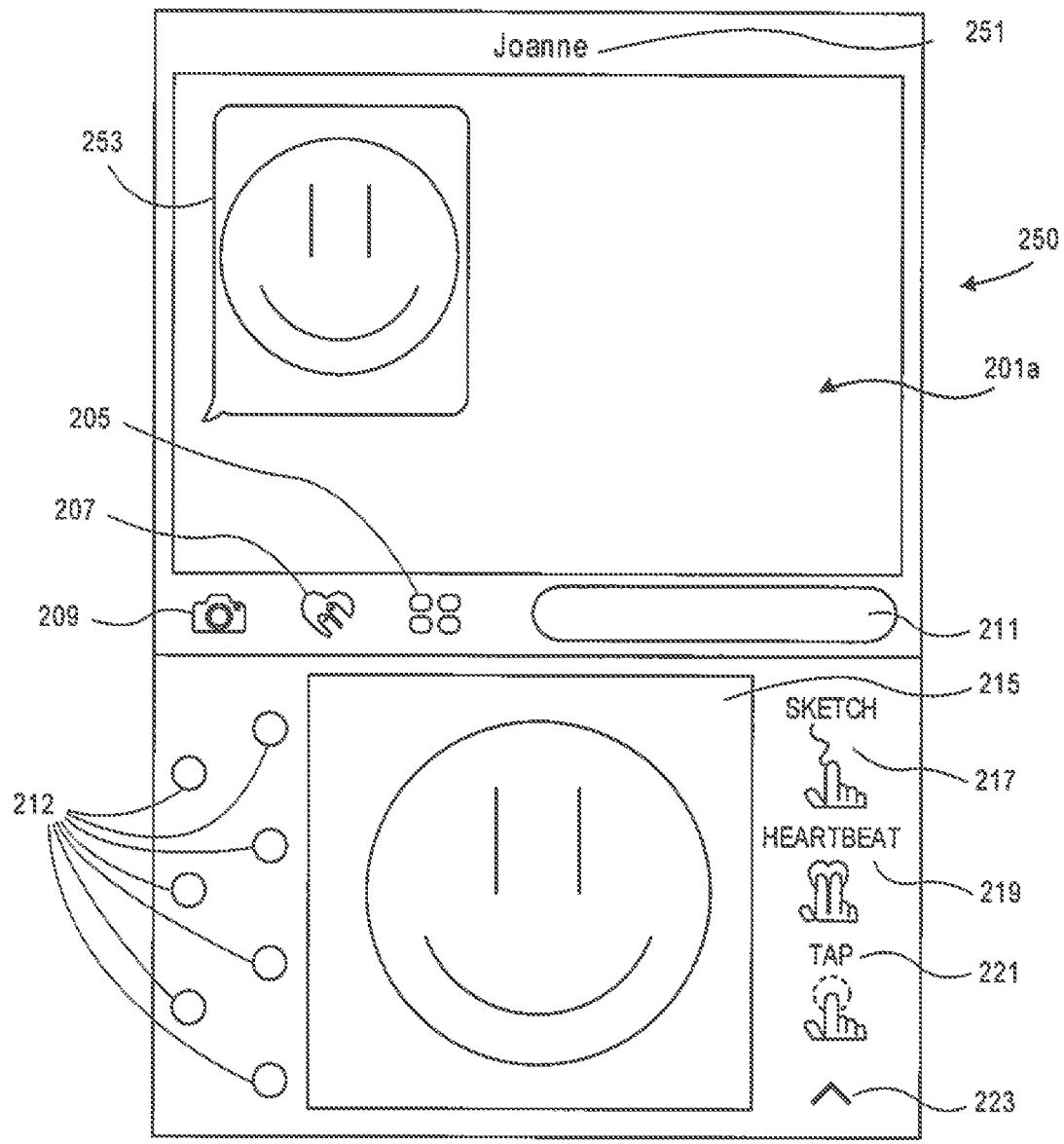
FIG. 5E shows an example of a user interface on a receiving device when the user of the receiving device selects the message bubble containing the content created by the extension app on the sending device so that the user of the receiving device can edit the content on the receiving device.
Figure 5F:
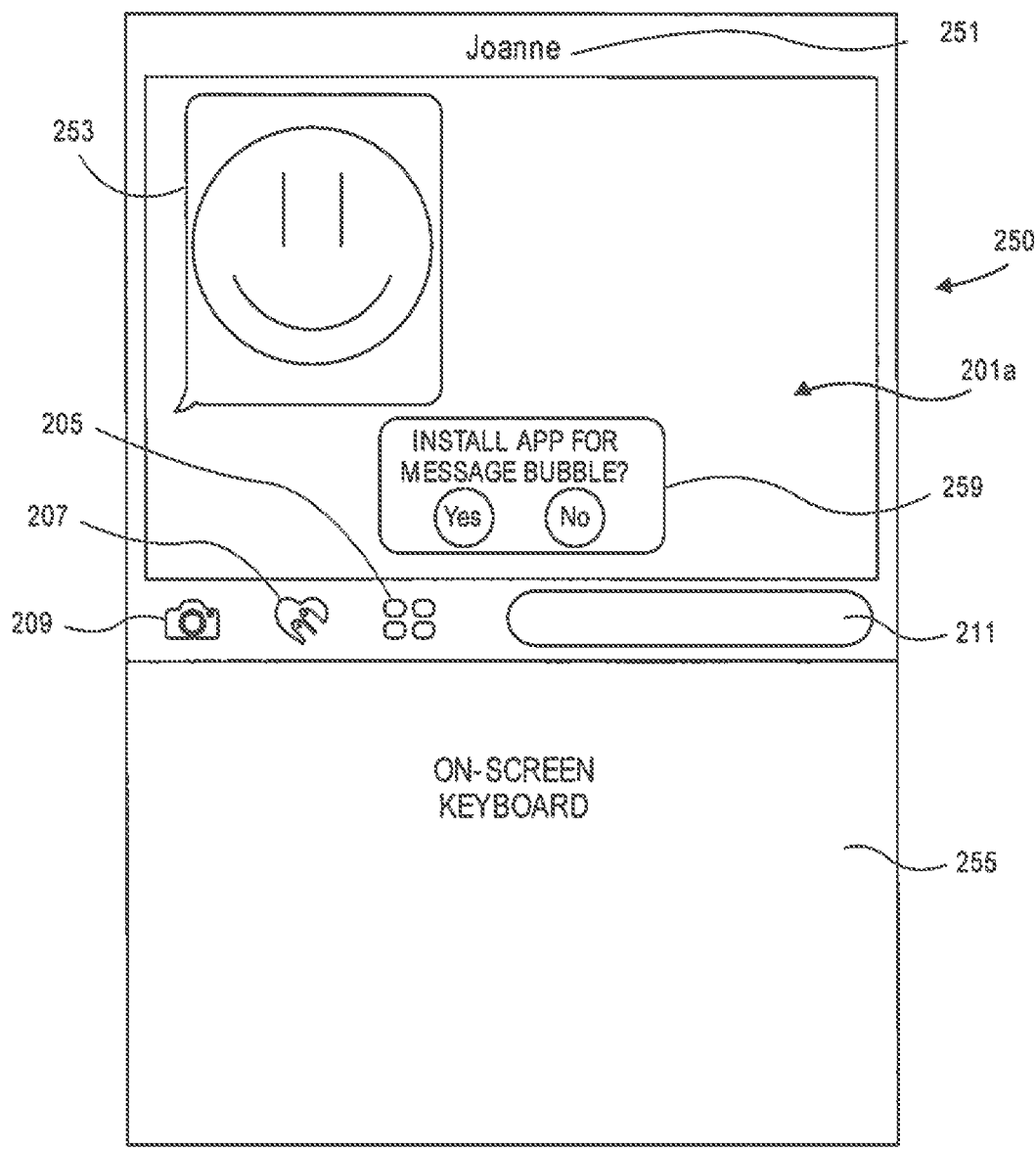
FIG. 5F shows an example of a user interface which offers to download and install an extension app for use with the messaging app on the device.

FIGS. 5D, 5E, and 5F illustrate what can happen on the receiver's device in response to receiving the content from the communication device 200 shown in FIG. 5C. Also, the flowchart shown in FIG. 6 can show the method performed at the receiving device, such as the communication device 250 shown in FIGS. 5D, 5E, and 5F. Referring now to FIG. 5D, it can be seen that the communication device 250 (used by Freddy) has received the happy face content which is shown in message bubble 253. This content was created by the extension app executing on communication device 200 which provided the happy face content to the messaging app executing on communication device 200 which in turn transmitted that content through a messaging service (e.g., a set of messaging servers, such as the messaging servers 51 shown in FIG. 2) to the messaging app executing on the communication device 250 which in turn presented the content in the message bubble 253. In one embodiment, the content can be rendered by the messaging app as it uses known standard formats (including standard image, audio, and video formats in one embodiment) and thus the extension app need not be installed or executing in order to show the content created by the counterpart (remote) extension application on the sending device. Thus in this case as shown in FIG. 5D, the message bubble 253 can present the content even though the counterpart extension application may not be executed or may not even be installed on the communication device 250. The messaging app shown in FIG. 5D includes, in its user interface, a message transcript 201A, a text entry region 211, and an on-screen keyboard 255. In one embodiment, content received from a remote extension app will not cause the launching automatically of the corresponding extension app on the receiving device even if the corresponding extension app is installed. In this embodiment, the corresponding extension app on the receiving device can be launched by the user's selection of the message bubble containing the content created by the remote extension app. If the user does select that content by, for example, touching or otherwise selecting the message bubble 253, then the extension app that corresponds to the remote extension app will be launched if installed on the communication device 250. The result is shown in FIG. 5E in which the user interface of the extension app has occupied the space in which the on-screen keyboard 255 was previously displayed and shows the happy face drawing within the canvas 215 allowing the user of the communication device 250 to alter or otherwise modify that sketch and perhaps send it back to the other user in the chat session or conversation. If, on the other hand, the corresponding extension app is not installed on the communication device, then in one embodiment the messaging app can present a notice to the user asking or offering to install the app for the particular message bubble which was selected. An example of this is shown in FIG. 5F in which the notice 259 includes two user selectable options, one of which will install the required app for the message bubble. In another embodiment, a sheet that shows a page of information from an extension app marketplace can be displayed within the view of the messaging app.

In one embodiment, the message transmitted from the remote device to the communication device 250 contains metadata which specifies the remote extension app used to create the content. In one embodiment, this metadata can be an app identifier, such as an identifier provided by an app marketplace or an extension app marketplace from which the extension apps can be downloaded and installed or can be a different identifier that can be associated with the identifier used by the app marketplace. In one embodiment, the notice 259 can result from the selection of the message bubble 253, while in another embodiment it can result automatically if the app identifier in the metadata for the content is not installed when the content for the message bubble 253 is received by the communication device 250.

Figure 6:
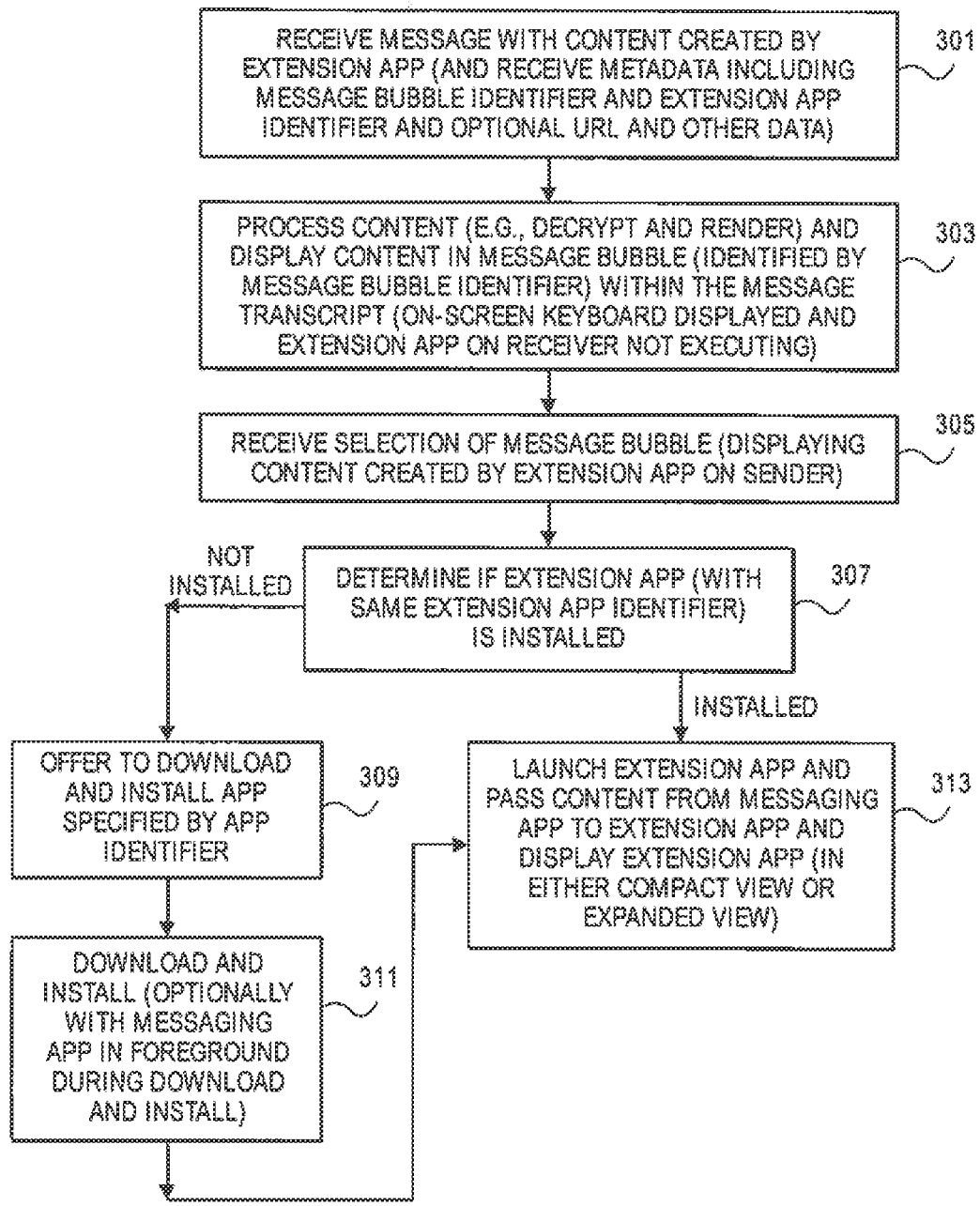
FIG. 6 is a flowchart which illustrates a method which can be performed on a receiving device according to one embodiment described herein.

FIG. 6 will now be referred to in conjunction with FIGS. 5D, 5E, and 5F to explain a method in one embodiment in which a receiving device processes content created by a remote extension app, such as the remote extension app executing in conjunction with the messaging app on communication device 200. In operation 301, a communication device can receive a message with content created by an extension app, such as a remote extension app operating in conjunction with a messaging app on a sending device. In addition, the communication device can also receive the metadata which can include a message bubble identifier, session identifier and an extension app identifier and potentially other data such as an optional resource locator and other data (state information) that may be associated with the optional resource locator and the resource locator may also include state information that is encoded into the resource locator. Further information with respect to the use of resource locators and data associated with the resource locators will be provided in conjunction with FIGS. 8, 9A, and 9B. Then in operation 303, the communication device which has received the message in operation 301 processes the content and displays the content in a message bubble which was identified by the message bubble identifier, and the message bubble is displayed within the message transcript. In one embodiment the processing of the content can include decrypting the content and rendering the content for presentation and display within the message bubble. In one embodiment, the content is displayed by the messaging app without assistance from the extension app; in other words, the extension app may not be installed or if installed is not executing on the communication device, and hence the on-screen keyboard is displayed in one embodiment. Then in operation 305 the communication device receives a selection of the message bubble displaying the content created by the remote extension app. In one embodiment, referring to FIG. 5D, the user can tap on the message bubble on a touchscreen or otherwise select (e.g. user uses a stylus on a touchscreen or uses a mouse with a desktop computer, etc.) the message bubble 253 to cause the selection in operation 305. In response to operation 305, the communication device, such as communication device 250 determines in operation 307 whether or not the extension app is installed. This can be performed in one embodiment by examining a list or registration of installed extension apps maintained by the messaging app, in one embodiment, the metadata received in operation 301 includes the app identifier, and the messaging app in operation 307 searches the list to determine whether the identifier is present in the list. If the identifier is not present in the list then the messaging app determines that the extension app is not installed, thereby causing the communication device to perform operation 309 in which the notice 259, shown in FIG. 5F can be displayed to the user to offer to download and install the app specified by the app identifier which was received as part of the metadata in operation 301. If the user selects the option "yes" then operation 311 is performed in which the messaging app causes the communication device to access the extension app marketplace (such as the extension app marketplace having a user interface shown in FIG. 14) to retrieve through a download process a copy of the extension app and to cause the extension app to be installed. In one embodiment, operation 311 may be performed entirely in the background so that the messaging app remains the foreground app during the download and install process. FIG. 9C shows an example of a message bubble 471 maintained in a message transcript during the download and install process, where the message bubble includes a progress bar 473 which indicates the progress of the download and install operation while the messaging app remains the foreground application displaying the message bubble 471 in the message transcript of the messaging app. In another embodiment of the operation 311, a sheet that shows a page of information from an extension app marketplace can be displayed over the messaging app (with a portion of the messaging app optionally still displayed), and the sheet can show a "buy" or install or download button, which if selected, can cause the download and installation of the extension app, and the sheet can be dismissed (removed from display) either by selecting a dismiss command or by selecting buy or install or download. After downloading and installing the extension app, processing can proceed to operation 313 in FIG. 6 in which the extension app is launched and the content and other data used or created by the remote extension app is passed (via IPC) to the extension app by the messaging app, and the extension app is displayed in either a compact or expanded view in one embodiment and the content created by the remote extension app is displayed within that view. As shown in FIG. 6, operation 313 also follows operation 307 if operation 307 determines that the extension app is installed. FIG. 5E shows one example of the result of operation 313.

In one embodiment, a messaging app can launch different types of extension apps in different ways depending upon the type of the extension app. For example, one type of extension app can be launched automatically in response to receipt of a message bubble containing content from an extension app having a certain predetermined type. Other extension apps having a different type may only be launched in one embodiment in response to the selection of a message bubble containing content from that extension app or by the selection of an icon representing the extension app in a browsable view, such as browsable view 571. It may be desirable to allow certain extension apps having a certain type to be launched automatically in response to receiving content that is displayed within the message transcript while not automatically launching other types of extension apps. In another alternative embodiment, one or more extension apps can be permitted to execute in the background and can be allowed to update their respective user interfaces that are presented in their respective message bubbles.

In an alternative embodiment, the metadata can include a format or extension identifier such as an identifier of an image format that can be used to determine available extension apps that can process that image format on the receiving device.

Figure 7A:
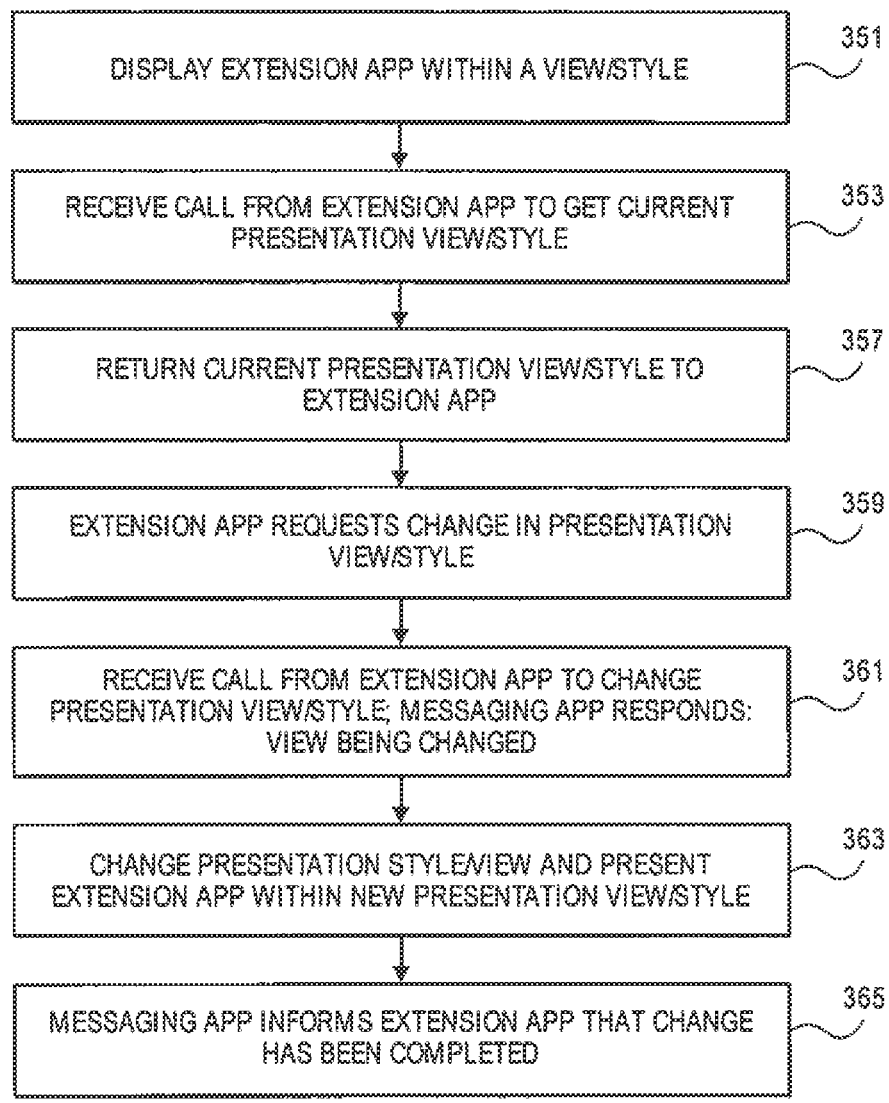
FIG. 7A is a flowchart which depicts a method according to one embodiment in which an extension app can change its view hosted by a messaging app according to one embodiment.
Figure 7B:
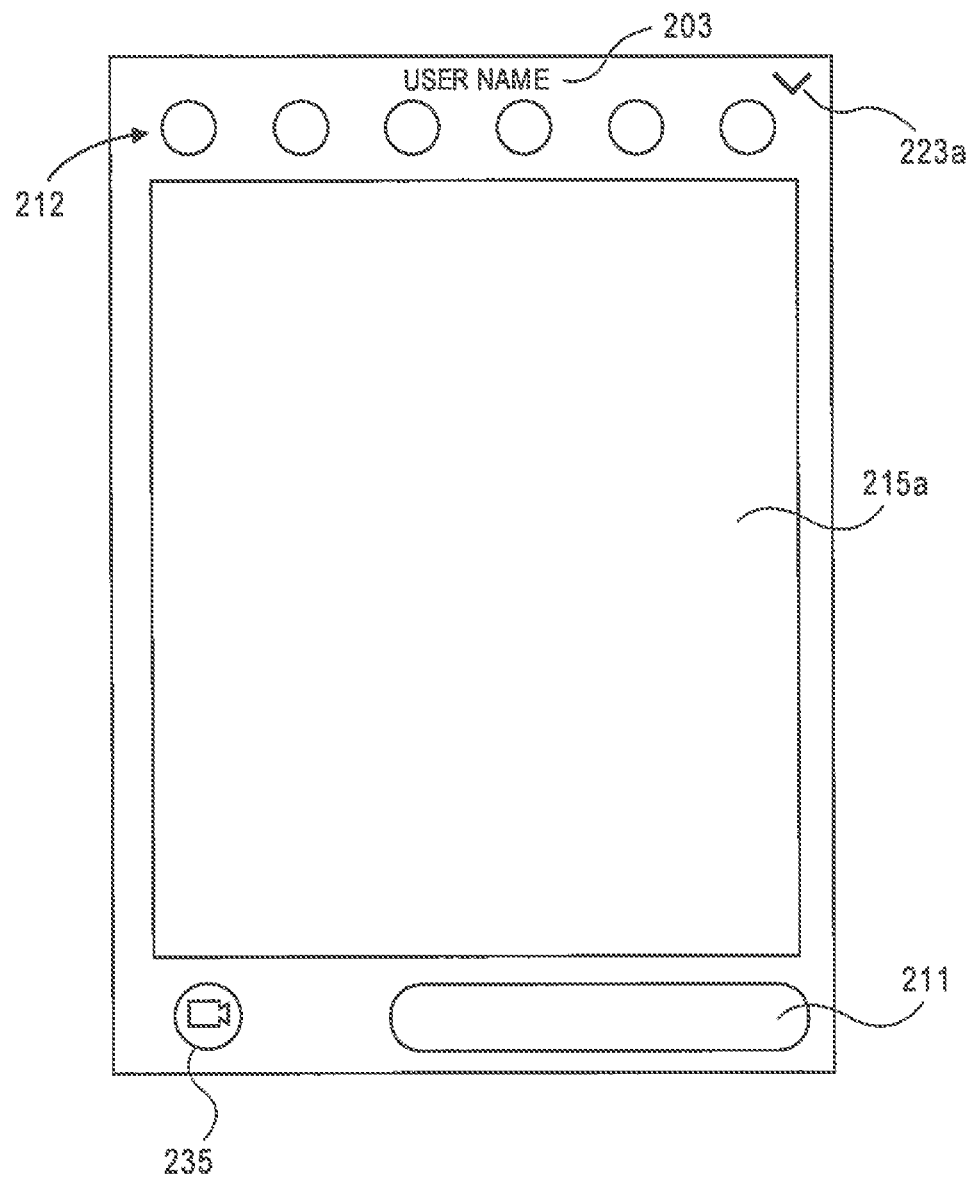
FIG. 7 shows an example of a user interface of an extension app in an expanded view according to one embodiment.

FIGS. 7A and 7B illustrate another aspect of the embodiments described herein in which the extension app can cause a view to be changed by sending communications to the messaging app to cause that change. In one embodiment, an application programming interface (API) can be provided between the extension app and the messaging app to allow the extension app to make calls to that API to change its view within the messaging app which hosts the view of the extension app. In one embodiment, an extension app can have at least two different views which can include a compact view and an expanded view. In one embodiment, the compact view may be a view which takes the place of the on-screen keyboard of the messaging app while the message transcript remains displayed in the user interface of the messaging app. In the expanded view, the message transcript is no longer displayed and the on-screen keyboard is not displayed but certain other components of the user interface of the messaging app, such as text entry region 211 and a camera activation icon 235 are displayed. FIG. 7B shows an example of an expanded view in which the drawing canvas 215A occupies most of the space of the touch screen. As shown in FIG. 7B, the compact view icon 223A can be selected by the user to cause the system to change from the expanded view shown in FIG. 7B back to the compact view, such as the view shown in FIG. 5A.

The method shown in FIG. 7A is one embodiment showing how the view can change, and it will be appreciated that in alternative embodiments, the sequence of operations may be performed in a different order and there may be omitted steps or intervening steps or additional steps.

In operation 351 of FIG. 7A, the extension app is displayed by the messaging app with a particular view or style. In operation 353, the extension app can make a call to the messaging app to get the current presentation view/style of the extension app. In operation 357, the messaging app can provide a return for the call from operation 353, and that return can indicate the current presentation view/style of the extension app. In response to that current presentation received in operation 357, the extension app can request a change in the presentation view/style by providing a call to the messaging app to cause that change to occur, and that call is received in operation 361. The messaging app in one embodiment can initially respond to this call with an acknowledgement that the view is being changed or will be changed. In response to the call, in operation 363, the messaging app changes the presentation style/view and displays the extension app within the requested view presentation view/style and in operation 365 the messaging app informs the extension app that the change of view has been completed. Referring back to FIG. 7B, if the user selects the compact view icon 223A, this can cause a call from the extension app to the messaging app to change the view of the extension app within the user interface of the messaging app.

Figure 8:
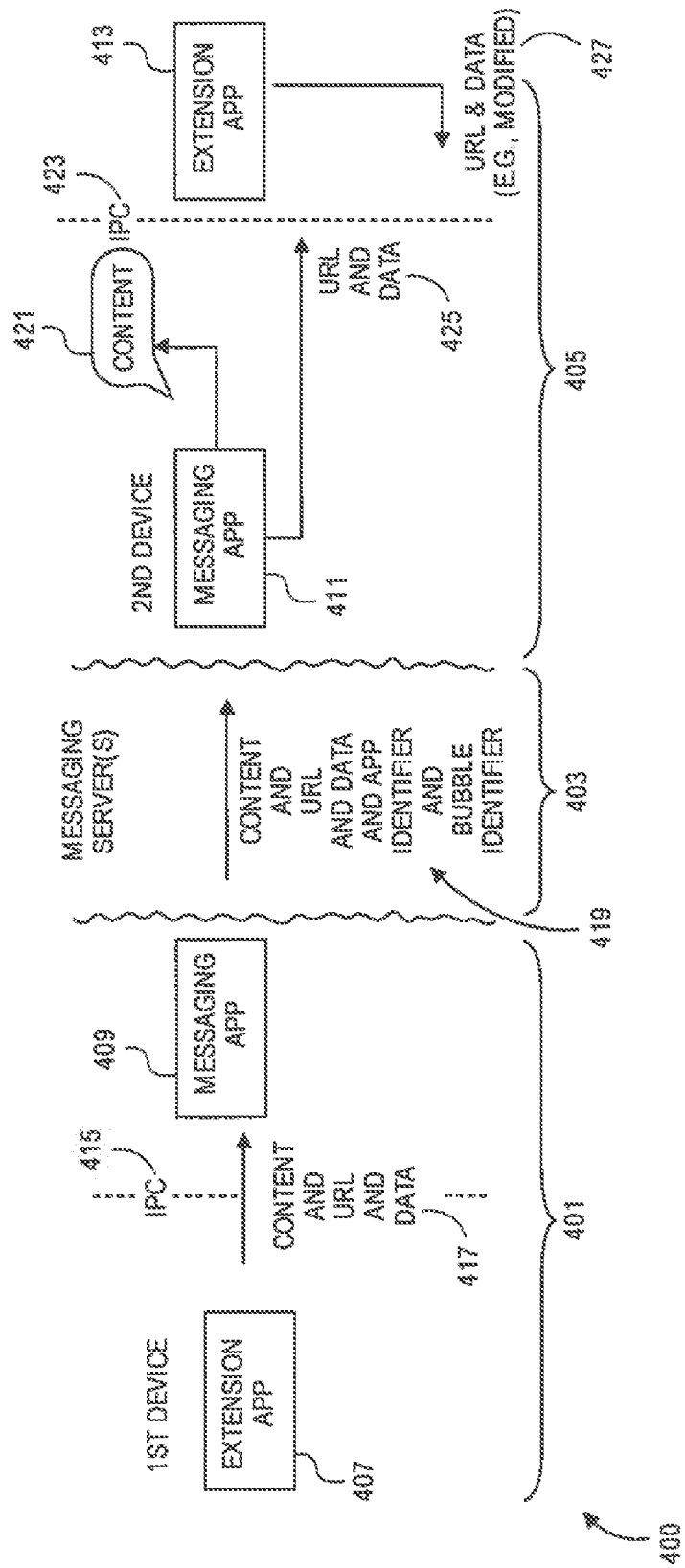
FIG. 8 shows an example according to one embodiment in which extension apps on two or more devices can interact with each other through the messaging apps on each device.
Figure 9A:
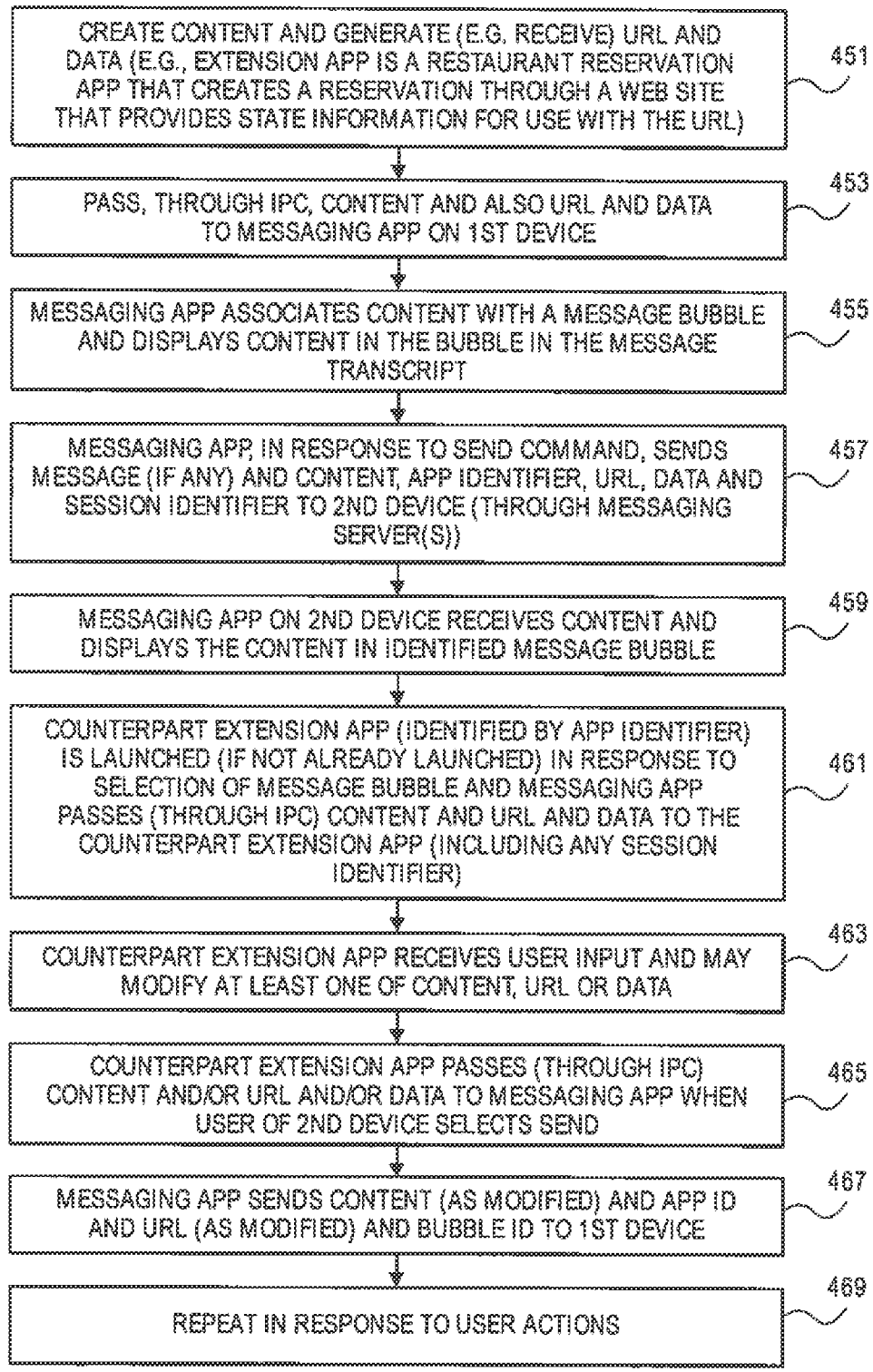
FIG. 9A is a flowchart which illustrates a method according to one or more embodiments described herein for allowing the interaction between extension apps on different devices.
Figure 9B:
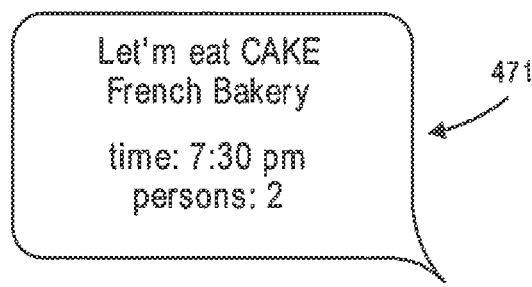
FIG. 9B shows an example of a message bubble in a user interface which can result from the method shown in FIG. 9A when two or more extension apps interact in a session.
Figure 9C:
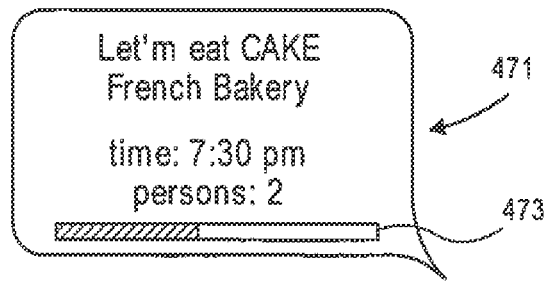
FIG. 9C shows an example of a message bubble according to one embodiment in which a download and install for a required extension app occurs while the messaging app remains in the foreground.

FIGS. 8, 9A, 9B and 9C will now be described relative to another aspect of the embodiments presented herein, in one aspect of this embodiment, an extension app and a counterpart extension app on another device can engage in a communication session and exchange information back and forth in their communication session, and all of this occurs within the context of a message transcript maintained by the two messaging apps which interface between the two extension apps as shown in FIG. 8. In one embodiment, plug-ins for a messaging app can also operate in a similar way and exchange information between the plug-ins through two messaging apps that are in a session. The messaging system 400 shown in FIG. 8 includes at least two clients devices, client device 401 and client device 405 and also includes a set of one or more messaging servers 403. The client devices 401 and 405 can be similar to the client devices 53 and 54 in FIG. 2, and the set of one or more messaging servers 403 can be similar to the set of messaging servers 51 shown in FIG. 2. Each client device can include an installed copy of a particular extension app (such as, for example, an extension app for making reservations at restaurants), and the extension app on each device can be used to create content (e.g. text, images, audio, video, etc.), and this content is passed, through an interprocess communication framework to the messaging app on the device for a specific message, which can be referred to as a message bubble, in the message transcript on the particular client device. The message app receives the content (and optionally other data from the extension app, including for example an identifier of the extension app, a resource locator and optionally metadata for use by a counterpart or remote extension app on the other device, etc.) and displays the displayable content (such as an image of a restaurant provided by the extension app which is a restaurant reservation app such as "Open Table" in the message bubble in the message transcript). In effect, the messaging app hosts a view within the messaging app and the content of that view is provided by the extension app. The resource locator and metadata in one embodiment are opaque to the messaging app (e.g. cannot be recognized by the messaging app) but can be used by the extension apps on each device to maintain state information for the session between the extension apps, and the messaging apps on each device act as a communication mechanism between the extension apps by passing the resource locator and metadata between the extension apps. In one embodiment, state information about the session may be encoded in the resource locator or may be provided in the metadata or may in both. In one embodiment, the content created from a session on each device is displayed within the same single message bubble (identified by a session identifier that can be maintained by the messaging app) in the message transcripts, and each time the content changes (based on changes from either device), the updated content continues to be displayed within a single message bubble in the message transcript and any prior message bubbles that displayed content in the session can be converted into breadcrumbs, and these prior message bubbles will also include the same session identifier as the new, updated message bubble. The operations and functions of the components shown in FIG. 8 will now be described while referring to FIG. 9A which shows a method of operating the messaging system 400 in one embodiment.

In operation 451 of FIG. 9A an extension app, such as the extension app 407 can create content and generate a resource locator and data (or can modify existing content, resource locator or data). The extension app can be similar to the extension app 83 and is executing in one embodiment in one process while the messaging app, which can be similar to the messaging app 76, is executing in another process and communication between the processes occurs through an IPC, such as the IPC 81 which can be a software framework or library for providing interprocess communication between two distinct processes. The extension app 407 can be, for example, a restaurant reservation app that creates a reservation through a website that can provide a state information for use with the resource locator (or the state information can be encoded into the resource locator). In one embodiment, the data provided with the resource locator can be a state information provided from the website, and the state information can include information about the particular restaurant and the time of the reservation and the number of people in the reservation. The extension app 407 can present, in either a compact view or expanded view the user interface for making the restaurant reservation through the website while the remainder of the messaging app is displayed, including for example the message transcript. Thus the user of the extension app 407 can see the context of the conversation in the message transcript while interacting with the extension app and the website (through the extension app) to create a restaurant reservation. In one embodiment, the user may be able to browse through various restaurants (within the restaurant reservation app) and search for restaurants. After the user of the extension app 407 has selected a restaurant and entered a reservation, the extension app 407 can pass, through the IPC 415, content and also the resource locator and data 417 shown in FIG. 8 for the messaging app on device 401. This is shown as operation 453 in FIG. 9A. In operation 455, the messaging app 409 associates the content received from the extension app 407 with the message bubble and displays content in the bubble in the message transcript in the user interface of the messaging app 409. Then in operation 457, the messaging app 409, in response to a send command received from the user, sends a message (if any) and content received from the extension app 407, and an app identifier which identifies the app 407 (and optionally an icon of the app 407), and the resource locator and the data (if any) and a session identifier to the second device through the one or more messaging servers 403 which pass the communication 419 to the second device 405 (also referred to as client device 405). In one embodiment, the operations 453 and 455 can occur as part of operation 457 in response to the messaging app receiving the selection of the send command. The icon of the app 407 can be displayed on the message bubble on the receiving device even if the counterpart extension app is not installed; see for example, icon 87 in FIG. 3B. In operation 459 shown in FIG. 9A, the messaging app 411 on the client device 405 receives the content from the one or more messaging servers 403 and displays the content in the identified message bubble 421 within the message transcript provided by the user interface of the messaging app 411. FIG. 9B shows a more detailed example of such a message bubble 471 having content created by a restaurant reservation extension app in one embodiment. In the example shown in FIG. 9B, the content includes the name of the restaurant, the time of the reservation and the number of persons of the reservation. In one embodiment, this content can be displayed by the messaging app without requiring that the extension app 413 be launched. In one embodiment, the extension app 413 is not launched until the user of client device 405 selects the message bubble 421, thereby indicating to the client device that the user of the client device 405 intends to interact with the content in the message bubble 421. In an alternative embodiment, the extension app 413 can be launched upon receipt by the messaging app 411 of the content but remain in the background and be ready for execution when the user of client device 405 enters a command to cause the extension app to appear. In operation 461, the extension app 413, which is identified by the app identifier provided in the communication 419 is launched, if not already launched, in response to selection of message bubble 421 and the messaging app 411 passes, through IPC 423 the content associated with message bubble 421 and resource locator and data 425 to the messaging app 413. In one embodiment, the extension app 413 is the counterpart extension app that is the same extension app as extension app 407, while in another embodiment they can be merely compatible in that they can process the same type of content.

At this point, the extension app 413 can receive user input by the user of client device 405 and can modify one or more of the content, the resource locator or the data. For example, the user of client device 405 can cause the extension app 413 to access one or more websites to make a modified restaurant reservation by modifying the time, the number of people, the particular restaurant, etc. In one embodiment, the extension app 413, and also the extension app 407 can interact directly (but separately and independently) with the web server by sending the resource locator and the data to the web server and receiving responses from the web server which may include modified data or modified resource locators, or new data and/or new resource locators etc. In one embodiment, the web server can store data for use during the session, and this stored data can include information for some or all of the state information that can also be maintained by the two extension apps in the session. Again, if the extension app 413 is presented for display in a compact view, then the user of the device 405 can interact with the extension app 413 to make the restaurant reservation while the context and conversation of the chat or messaging session is shown in the message transcript of the messaging app 411. The user of the client device 405 can scroll through the message transcript while continuing to look at and interact with the extension app 413. Thus, the extension app 413 can, in operation 463 receive user input and may modify at least one of the content, the resource locator or data, and then can pass, in operation 465 the resource locator and data 427 (which may be modified or new) to the messaging app 411. In turn, the messaging app 411 in operation 467 can send the content, which may be modified, and the app identifier and the resource locator (which may be modified) and data (which may be modified) and the bubble ID back to the client device 401. As shown in operation 469, this process can repeat over time as the two users work on setting up a restaurant reservation in the example provided herein.

It will be appreciated that many different types of extension apps can provide a collaborative environment between the users of client devices 401 and 405 to exchange information and collaborate together and that restaurant reservation is one such type. Thus, it will be appreciated that the restaurant reservation example that is described relative to FIGS. 8 and 9A is merely an example of one such type of extension app which can provide a collaborative environment in the context of the user interface of a messaging app. Examples of other types of extension apps which can provide a similar collaborative environment include, for example: sticker extension apps; imaging apps; drawing apps; content creation apps; games; music creation apps; content consumption apps; polling apps; map apps; etc.

The collaborative environment shown in FIG. 8 and described relative to FIG. 9A can utilize breadcrumbs in one or more embodiments, and each of the breadcrumbs can be identified by a session identifier. A breadcrumb represents a converted message bubble and is identified by a session identifier that is shared with other message bubbles in the session. Each prior message bubble that is identified with the same session identifier as a new message bubble can be converted in one embodiment into a breadcrumb which can appear differently than the original content shown in the message transcript. As each new message bubble in the session arrives or is added to the message transcript, the prior message bubble identified with the same session identifier can be converted into a breadcrumb in one embodiment, and this is shown in the message transcripts shown in FIGS. 9D, 9E, 9F, 9G, and 9H. FIGS. 9D and 9H show a message transcript 510 on Joe's device, and FIGS. 9E, 9F and 9C show a message transcript 17 on Lester's device. Message transcript 510 shows Lester's user name 511, and message transcript 517 shows Joe's user name 518. In the example shown in FIGS. 9D, 9E, 9F, 9G, and 9H, Lester and Joe are engaged in a text messaging conversation and are each using an extension app, such as an image creation app or other extension apps. For example, Lester can be using extension app 407 shown in FIG. 8 and Joe can be using extension app 413 shown in FIG. 8. Lester's device can be using messaging app 409 while Joe's device can be using messaging app 411. Referring back to FIG. 9D, it can be seen that the message transcript 510 includes message bubble 512 and message bubble 513 which indicate the content of the conversation within the message transcript 510. In addition, Joe has used the extension app 413 to create content 515 which is appended to message bubble 514. For example, Joe may have entered text as a text message and also created content using the extension app 413 and then cause both the text shown within message bubble 514 and the content 515 to be sent to Lester's device. The right side of the message transcript 510 shows messages that were sent by Joe while the left side of the message transcript 510 shows messages that were received from Lester. Referring now to FIG. 9E, it can be seen that message bubble 513 is now on the right side of the message transcript 517 while message bubble 514 and content 515 are on the left side of the message transcript 517 on Lester's device. Hence, Lester's device has received the text message within message bubble 514 and has also received the content generated by the extension app on Joe's device. Lester can then tap on the content 515 to cause the launching of the corresponding or counterpart extension app on Lester's device. The content 515 is associated with a session identifier which is maintained for the extension app on Lester's device. For example, at this point in the process, operation 461 shown in FIG. 9A can be performed on Lester's device as a result of the user selecting the content 515 which can be displayed within a message bubble in one embodiment. Lester can then use the extension app on Lester's device to create modified content or new content and send that modified or new content back to Joe. In FIG. 9F, it can be seen that Lester has created modified or new content 521 which is shown within a staging area 519 which shows text and other content that is ready to be sent and will be sent in response to selection by a user of a send command, such as the send button 523 shown in FIG. 9F. When Lester selects the send command with the content shown in the staging area 519, this causes the text message 520 and the new or modified content 521 to be sent to Joe, and this can be seen in FIG. 9G in which message bubble 5211 shows the text message 520 on the right side of the message transcript 517 which also shows the content 521 which was modified or created as new by Lester using the extension app 407 on Lester's device.

It can be seen from FIG. 9G that content 515 has now been converted into a breadcrumb 515A. This conversion in one embodiment can be performed by the messaging app or alternatively by the extension app. In one embodiment, the extension app can provide the text which appears within the breadcrumb 515A, and the messaging app will use the session identifier to identify the message bubble that will be converted into a breadcrumb and this will cause the conversion of content 515 into the breadcrumb 515A and display the breadcrumb next to the associated message bubble 514 without converting that message bubble 514 into a breadcrumb in one embodiment. Thus, FIG. 9G shows how a session identifier associated with prior message bubbles or content created by an extension app can be used to convert the prior message bubble(s) into a breadcrumb on a sending device. FIG. 9H shows how the conversion is displayed in one embodiment on the receiving device. In the figure shown in FIG. 9H, the message bubble 520A is shown on the left side of the message transcript 510 along with the new or modified content from an extension app from Lester's device. The content 515 on Joe's device has been converted into a breadcrumb 515A on the right side of the message transcript and is displayed adjacent to the message bubble 514 which accompanied the content 515 when the content 515 was originally sent.

If the receiving device, such as client device 405 in operation 459 is capable of installing and using the extension app (identified by the app identifier provided in communication 419) but that the extension app is not installed on the receiving device, the receiving device can, within the user interface of the messaging app offer to download and install the extension app (again specified by the app identifier in communication 419, on the receiving device). FIG. 9C shows an example in which the content from extension 407 can be displayed on the client device 405 in a message bubble 471 and the client device 405 is in the process of downloading and installing the extension app identified by the app identifier in communication 419. In the example shown in FIG. 9C, the content is displayed within the message bubble 471 while the extension app 413 is being installed. In one embodiment, a progress bar 473 (or alternatively a progress circle) can be shown within the message bubble 471 during the installation process. In one embodiment, the downloading and installation process can be performed in the background while the messaging app remains the foreground application. If the receiving device is not capable of installing or using the extension app, then the resource locator and the metadata can be passed in one embodiment to a web browser on the receiving device, and the web browser can become the foreground app and allow for the user interaction with the web page referred to by the resource locator.

Figure 10:
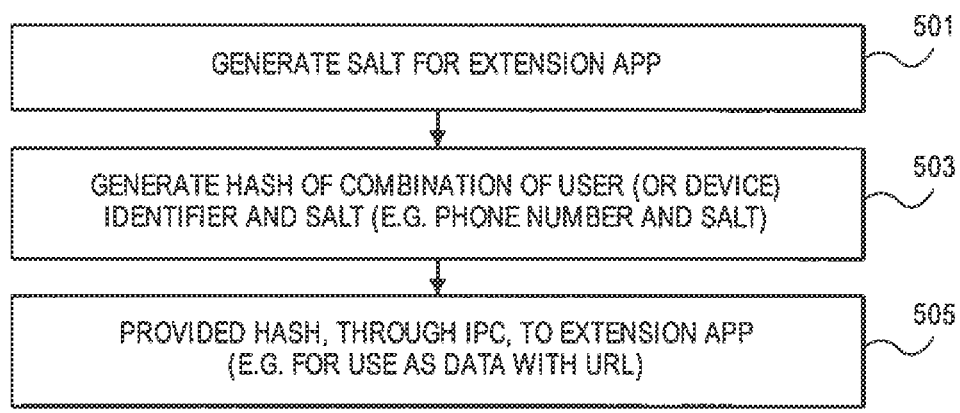
FIG. 10 is a flowchart which illustrates a method according to one embodiment described herein.

In some embodiments, it may be desirable to provide an identifier of each user to each extension app executing on a client device, particularly in the case of a collaborative environment in which two or more users are interacting through the messaging apps and the extension apps. FIG. 10 shows an example of a method to provide an identifier for each extension app without causing a loss of the user's privacy. The method shown in FIG. 10 can be performed by each messaging app on each client device. In one embodiment, the method can be performed in response to a call from an extension app to an application programming interface (API) which can allow the extension app to request an identifier of the local user. In one embodiment, the identifier can be the local user's email address or phone number or other identifier used by the messaging system. The identifier provided to the extension app is an obfuscated identifier created, in one embodiment, by the method shown in FIG. 10. In operation 501, the messaging app can generate, in response to a call from the extension app, a salt for the particular extension app. In one embodiment, the salt can be a random number which is associated with that particular extension app. Then in operation 503, the messaging app can generate a hash (such as a SHA-1 hash) of a combination of a user or device identifier and the salt. For example, the user identifier may be the phone number or email address of the user and that phone number or email address is combined with the salt and then the hash is created for that combination in operation 503. Then in operation 505, the hash is provided, through the IPC, to the extension app, and that hash value can be used as data with the resource locator which can then be sent to the other extension app to identify the user that has made changes or has created a content. In another embodiment, the messaging app can obfuscate the identifier by maintaining a mapping of the identifier and a randomly generated unique identifier for each extension app. In other words, for a given extension app, the messaging app can generate a random (and unique) identifier for the extension app and associate (e.g., map) that random identifier with the identifier of the user (e.g. local user's email address or phone number or other identifier used by the messaging system). This random identifier for the given extension app can be provided to the extension app, but the identifier is not provided to the extension app. Another extension app would receive a different, randomly generated identifier. This extension app specific identifier can then be provided to a counterpart extension app on another device so that the two extension apps can keep track of which users performed which actions in the context of a session or other collaborative environment.

Figure 11:
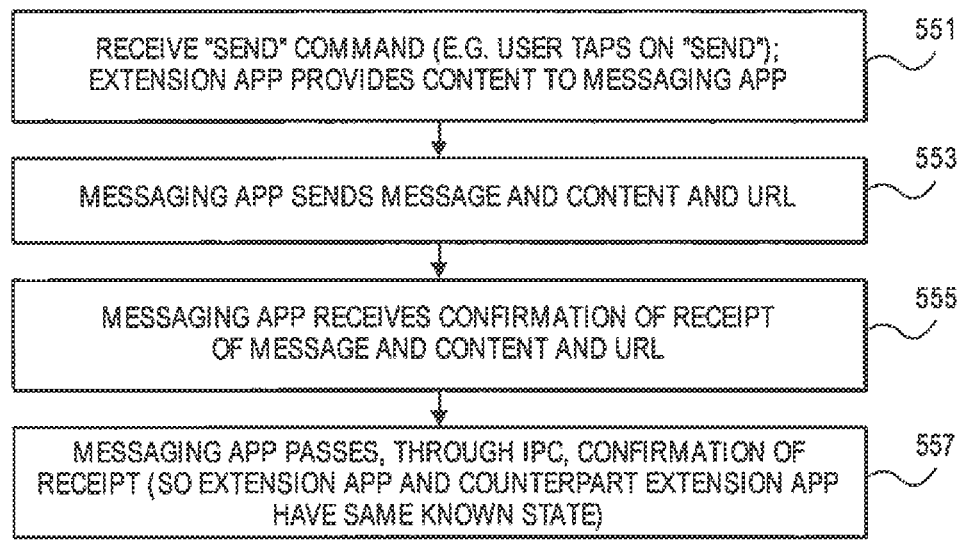
FIG. 11 is a flowchart which illustrates a method according to one embodiment described herein.

In one embodiment, the messaging systems described herein can provide confirmation of receipt of messages to one or more extension apps, and this may be useful in certain cases in which the extension app needs to be assured that the remote extension app has the same known state as the local extension app. FIG. 11 shows an example of a method for providing confirmation of receipt. In operation 551, the messaging app receives the "send" command from a user and in response the local extension app provides the content to the messaging app. In turn, in operation 553, the messaging app sends the message and message bubble identifier and content and resource locator (if any) through the one or more messaging servers to a receiving device which also includes a message app. At some point, the messaging app on the local device in operation 555 receives a confirmation of receipt of the message and content and optional resource locator, and then can pass, in operation 557, through the IPC the confirmation of receipt to the local extension app so that the local extension app knows that the remote extension app has the same known state when the extension app provided its content for transmission to the remote extension app.

Figure 12:
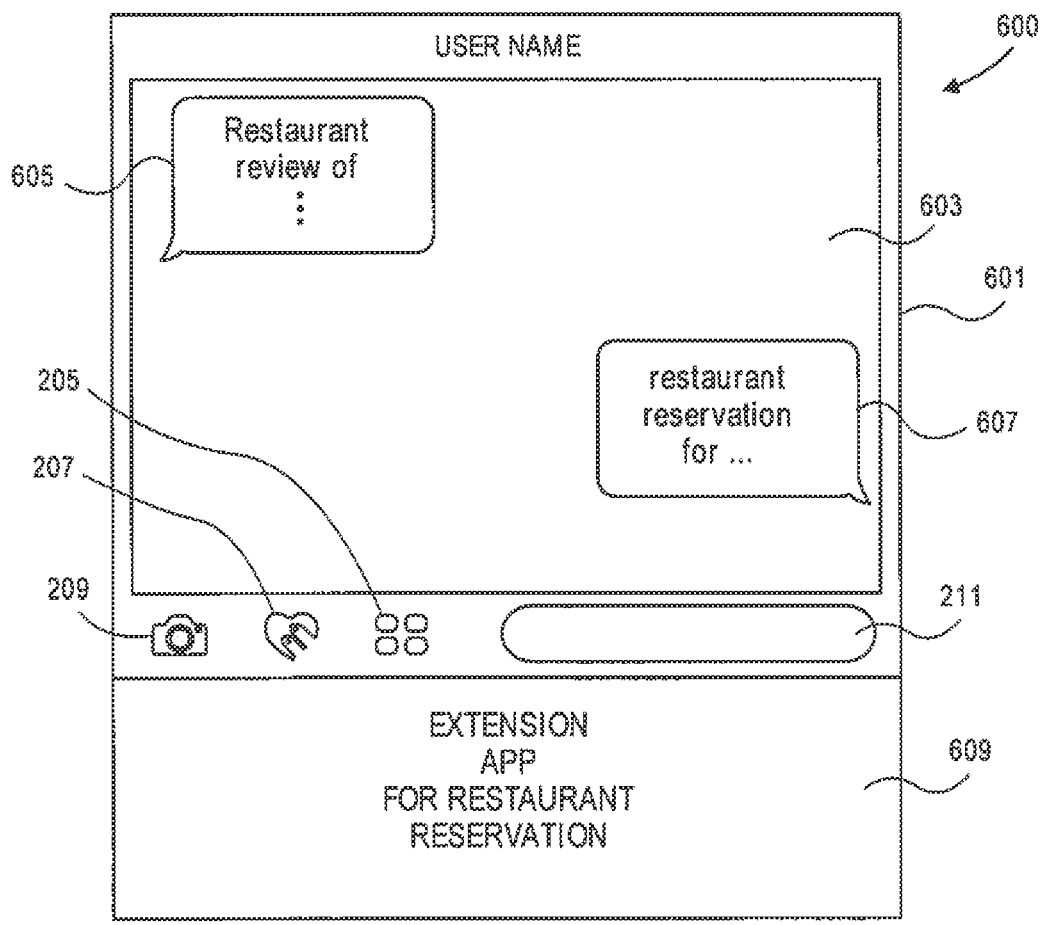
FIG. 12 shows a user interface of a messaging app in which content from two or more different extension apps is presented within the same message transcript provided by the messaging app.

FIG. 12 shows another aspect to the embodiments described herein, and that aspect relates to the presentation of multiple message bubbles within a message transcript where different message bubbles have content created by different extension apps, and at least one of which may be executing (and have its content displayed in a compact view) while the message transcript of the user interface of the messaging app is also displayed. FIG. 12 shows an example of such an aspect. The communication device 600 in this embodiment includes a touch screen 601 which displays a message transcript 603 which includes two message bubbles 605 and 607. In addition, the messaging app presents a compact view 609 of an extension app, which in this case is an extension app for a restaurant reservation. In the example shown in FIG. 12, the extension app for a restaurant reservation has been used to send a message showing the content of a restaurant reservation, which is depicted as message bubble 607. This may have occurred as a result of receiving a message from another user who uses another communication device which provides the content of a restaurant review from another extension app. In the example shown in FIG. 12, message bubble 605 shows the content created by a remote extension app for providing restaurant reviews which is different than the extension app for making a restaurant reservation. In one embodiment, both extension apps may be executing on both communication devices that are part of the messaging session or chat.

Figure 13A:
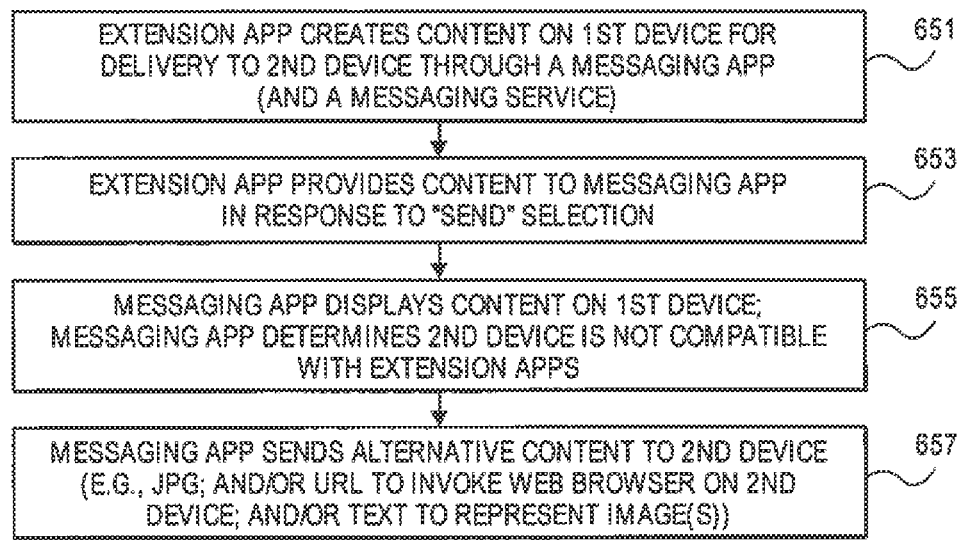
FIG. 13A is a flowchart which shows a method according to one embodiment for providing backward compatibility for older devices or older messaging systems.
Figure 13B:
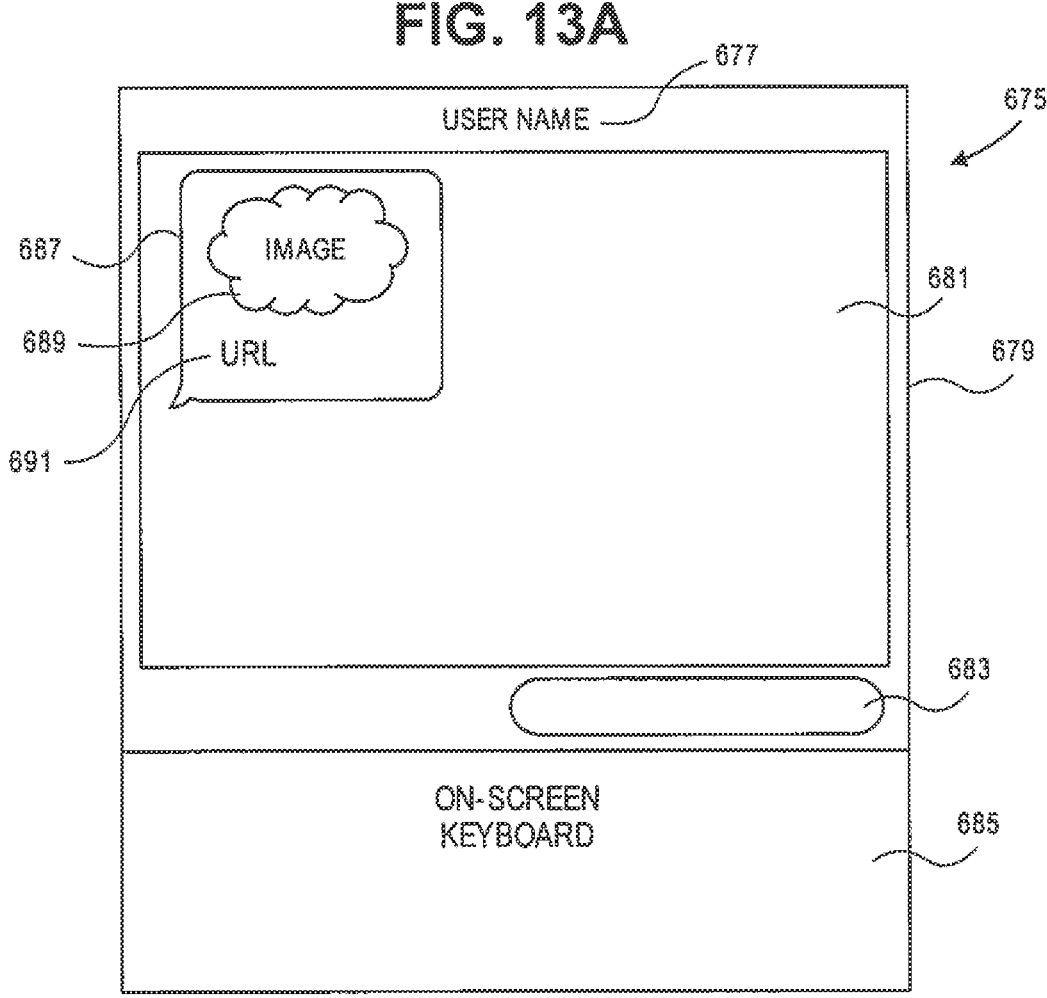
FIG. 13B shows an example of a user interface in which backward compatibility has been provided within a messaging app.

Another aspect of the embodiments described herein relate to backward compatibility, and that aspect is shown in FIGS. 13A and 13B. Certain older devices may not be compatible with the extension app architecture described herein or may not use this architecture or may not even be smartphones. In one embodiment, a client device which is sending the message may be able to provide alternative content, either automatically or based upon a determination that the receiving device is not compatible with extension app. A method for providing backward compatibility is shown in FIG. 13A. In operation 651, an extension app on a sending device creates content on the sending device (first device) for delivery to a second device through a messaging app and a messaging service. This can be similar to operation 451 in FIG. 9A. The content created in operation 651 can then be passed through an interprocess communication to the messaging app in operation 653 in response to the messaging app receiving the user's "send" selection. Then in operation 655, the messaging app can display the content on the first device and also determine that the second device is not compatible with extension apps. In one embodiment, this can be determined as a result of receiving information about the receiving device (second device) from one or more messaging servers, such as the one or more messaging servers 51 shown in FIG. 2 which can maintain information about the state of each device, such as the version of the operating system of the device or the type of device, etc. As a result of determining that the second device is not compatible with extension apps, the messaging app can in operation 657 send alternative content to the second device, and FIG. 13B provides an example of this alternative content.

The communication device 675 shown in FIG. 13B may be, for example, an older smartphone which uses an older operating system that is not compatible with extension apps described herein. Nevertheless, the communication device 675 includes a touch screen 679 and a text entry region 683 and an on-screen keyboard 685 that provide functionality of a messaging app which also displays a message transcript 681 which includes a message bubble 687. The message bubble 687 contains the alternative content provided by a sending message app on a remote device. In this case the content includes an image 689 and a resource locator 691 which may be user selectable to cause the display of a web page which the resource locator 691 refers to. In other words, the resource locator 691 may be user selectable to invoke a web browser on the communication device 675 to allow the user of the communication device 675 to interact through a web browser with the web page which may have the same affect in certain instances as an extension app interacting with the website.

Another aspect of the embodiments described herein relate to a service, such as an app marketplace that can provide a plurality of different extension apps for use within a messaging app according to the one or more embodiments described herein. The service or app marketplace can present browsable views of the plurality of different extension apps and messaging app plug-ins and provide information about those various extension apps and provide for downloading of those extension apps to a client device to allow the client device to install one or more extension apps. FIG. 14A shows an example of a method for using such a service or app marketplace and FIG. 14B shows an example of a user interface for a messaging extension app marketplace. The app marketplace shown in FIG. 14B may be invoked in one embodiment from a browsable view of installed extension apps within the user interface of the messaging app on a client device. For example, the selection of icon 167 shown in FIG. 4B may cause the presentation of the messaging extension app marketplace shown in FIG. 14B. The user can then browse through the one or more collections of messaging extension apps and select one or more extension apps which may be free or may be purchased. In the example shown in FIG. 14B, the messaging extension app marketplace 725 can include a navigation bar 729 and a browsable view of one or more messaging extension apps, such as apps 726, 728, and 731 displayed on the touch screen 727. The user can browse through the apps by swiping, in one embodiment, the user's finger across the touch screen or by the use of a navigation bar 729. The user can then select the download and install one or more of the extension apps, and as a result the messaging app on the user's client device can add an icon representing the newly installed extension app into the browsable view of installed extension apps, such as the browsable view 157 shown in FIG. 4B. In addition, the messaging app can add the installed extension app into a list of installed extension apps along with the identifier of the app ("app identifier" provided by the app marketplace. While the user's use of the app marketplace shown in FIG. 14B is one way of installing extension apps, another way is shown in FIG. 14A in which the installation process begins as a result of the user interacting with a message in the message transcript of a messaging app.

Referring now to FIG. 14A, a messaging app in operation 701 can receive content (and an optional resource locator and data) created by an extension app on a remote device, such as a first device, and can also receive an app identifier of the extension app on the remote device. In one embodiment, the app identifier can be the same identifier provided by the app marketplace when the extension app was installed on the first device or can be a different identifier that is associated with the app store's identifier. Then in operation 703, the messaging app on the second device can display the content in a message bubble and can retain the resource locator and data if provided. At this point, the messaging app in this embodiment does not attempt to launch an extension app which in fact is not installed on the second device at this point in time. Then in operation 705, the messaging app receives a selection, such as a tap, of the message bubble containing the content provided by the extension app from the first device, and the messaging app determines that the extension app (as identified by the received app identifier) is not installed on the second device. At this point, as shown in operation 707 of FIG. 14A, the messaging app offers to download and install the extension app on the second device and the user can select to install that extension app which was identified by the app identifier received in operation 701. In some instances, the user may need to purchase the extension app before it can be downloaded and installed. The offer to download and install may be presented in a notice, such as the notice 259 shown in FIG. 5F, and this notice may include a selectable option to cause the downloading and the installing of the extension app for the selected message bubble. Then in operation 709, the second device downloads and installs the extension app and can launch the newly installed extension app. In one embodiment, the download and install can occur in the background while the messaging app remains the foreground. In one embodiment, the progress of the download and install can be shown in a progress bar, such as the progress bar 473 shown within the selected message bubble. After operation 709 is completed, then the newly installed extension app can be used on the second device and, the messaging app can provide, in operation 711, the content and optional resource locator and data to the extension app the second device within the view hosted by messaging app.

In one embodiment, the messaging app may cause the automatic updating of extension apps which have been installed. In another embodiment, the messaging app may provide alerts or notices to the user that certain extension apps are in need of being updated and the notifications about these updates can be received from an extension app marketplace in one embodiment. This can allow a user to selectively decide whether or not to update specific messaging apps.

Figure 15:
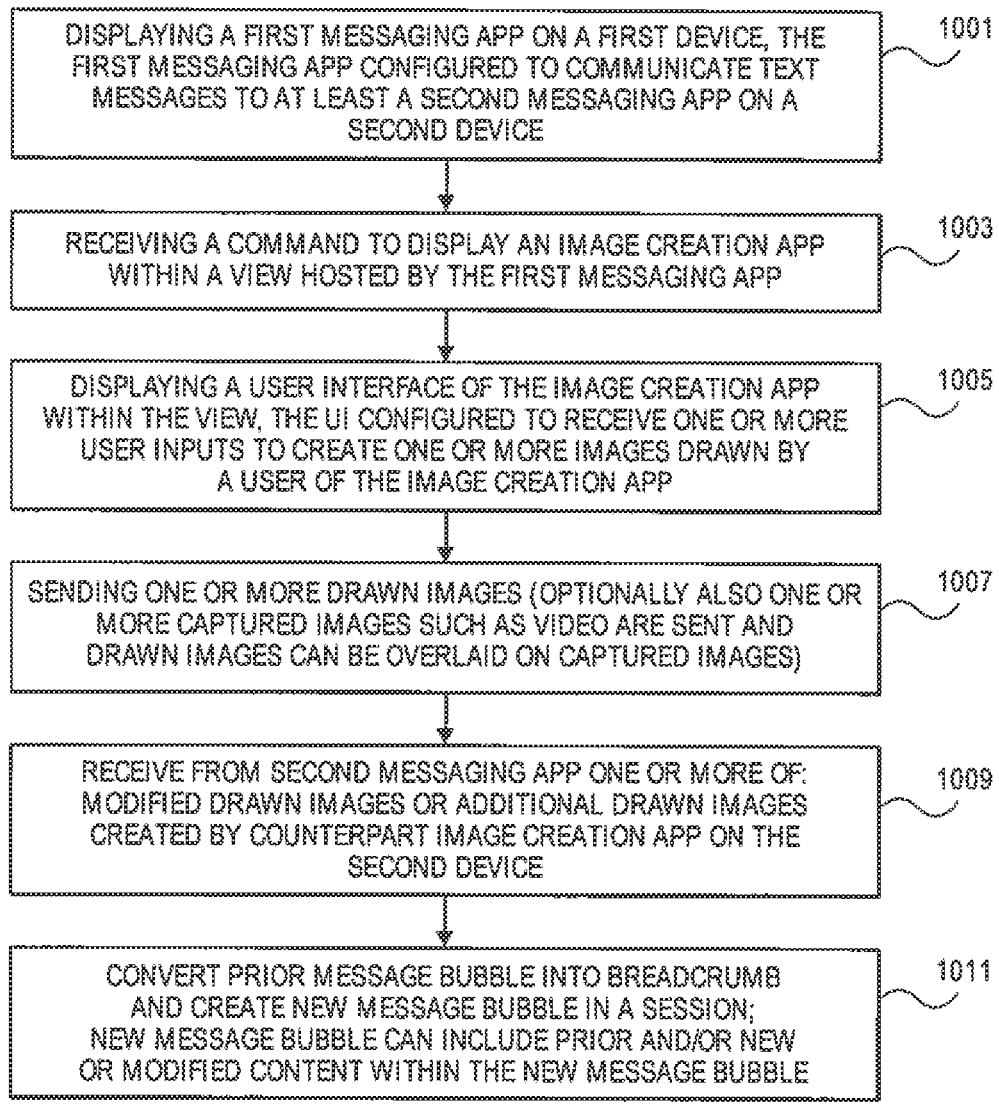
FIG. 15 is a flowchart which shows a method according to one embodiment described herein which supports an image creation app. The method shown in FIG. 15 in one embodiment can be performed on a first device.

A method for using an image creation app in conjunction with a messaging app, such as a first messaging app on a first device, is shown in FIG. 15. The method can begin in operation 1001 in which a first messaging app is displayed on a first device. FIG. 1B shows an example of a messaging app, such as the first messaging app which is displayed on communication device 10A. Then in operation 1003, the first device can receive a command to display an image creation app within a view hosted by the first messaging app. In one embodiment, the command can be the selection of a message bubble having content created by an image creation app, or the command can be the selection of an icon representing the image creation app, such as the icon 23 shown in FIG. 1B or the command can be the selection of an icon shown in a browsable view of installed extension apps such as the browsable view 157 shown in FIG. 4B. In one embodiment, the image creation app can be a plug-in which operates in the same process as the first messaging app and hence can operate within the same memory space as the first messaging app; in another embodiment, the image creation app can be an extension app which runs in a separate process from the first messaging app and which can use the architecture shown in FIG. 3A which is described above. In operation 1005 a user interface of the image creation app is displayed in response to the command received in operation 1003. The user interface of the image creation app is displayed within a view hosted by the first messaging app. FIG. 5A shows an example of a messaging app hosting a view of the user interface of an image creation app, and FIG. 18A also shows an example of a user interface of an image creation app which presents its user interface within a view hosted by the messaging app.

Referring to FIG. 18A, the communication device 1301 can be the first device referred to in FIG. 1. The user interface of the image creation app can include a drawing canvas 1305 displayed on the touch screen 1303 and can also include one or more drawing controls such as drawing controls 1308 and 1309 which appear below the user name 1307 which indicates the user name of the user of the other device which is in the conversation provided by the messaging app on the communication device 1301. The compact view icon 1310 can be selected by the user to cause the compact view of the image creation app which is shown in FIG. 5A. The image creation app shown in FIG. 18A also includes a camera control icon 1312 which the user can select to turn on one or more cameras on the communication device 1301 in order to capture still images (e.g. photographs) or video. In one embodiment, when the user selects the camera control icon 1312, the imaging system enters a preview mode in which the drawing canvas 1305 displays the current images captured by the selected camera. The messaging app on communication device 1301 also presents or displays the text entry field 1314 which can be similar to the text entry region 211 shown in FIG. 5A. In one embodiment, selecting the text entry field 1314 can cause the user interface to change to present the on-screen keyboard. The user interface of the image creation app in one embodiment is configured to receive one or more user inputs to create one or more images, such as images drawn the by user of the image creation app. For example, the user can touch the touch screen 1303 to draw lines or circles or other objects, and the image creation app records and stores those drawn images. In addition, still images or video can be collected by capturing images through one or more cameras. Further, in one embodiment, the image creation app can capture one or more images and concurrently also record drawn images which are drawn the by user. In one embodiment, the drawn images can be drawn and recorded as an overlay on the one or more images captured by the one or more cameras of the communication device 1301. This is shown in FIGS. 18B and 18C. In particular, the user of communication device 1301 has captured one or more images 1317 which is displayed within the canvas 1305 shown in FIG. 18B. The image creation app can provide several controls in the form of user selectable buttons to allow the user to capture images or video and to switch between front facing and back facing cameras. Moreover, the user interface can include a reset button to allow the user to erase or reset the drawing canvas to its initial blank state. In particular, reset button 1319 can be selected to cause the resetting of the drawing canvas. The photo button 1321 can be selected to cause the image creation app to capture a still image. The video button 1323 can be used to record video through a selected camera of the communication device 1301. In one embodiment, the communication device can have both a front facing and a back facing camera and the user can switch between those cameras by selecting (e.g. tapping of the user's finger or stylus) the switch button 1325. In the example shown in FIGS. 18B and 18C, the user of communication device 1301 has used the image creation app to capture one or more images 1317 (e.g. a still image) and then has drawn on the one or more images 1317 by adding drawn lines 1327 shown in FIG. 18C; in this case the drawn lines 1327 are drawn by the user of the communication device 1301 while the one or more images 1317 was displayed on the touch screen 1301; on another embodiment, the drawn images may be drawn by the user before capturing one or more images and then the images can be captured.

Referring back to FIG. 15, after the user has used the image creation app in operation 1005 to create one or more images and optionally also to capture one or more images, then in operation 1007 the first device can send the one or more drawn images or the one or more captured images or a combination of both drawn images and captured images. In one embodiment, the user of communication device 1301 can select a send command which can cause the created image to be sent by the messaging app, which is the first messaging app operating on device 1301 to the other user who is specified by the user name 1307. FIG. 18D shows the user interface of the first messaging app on the communication device 1301 which corresponds to the first device in the method of FIG. 15. The first messaging app displays the on-screen keyboard 1331 in one embodiment after the one or more images have been sent. The sending of the one or more images can result in one embodiment in the presentation of the message bubble 1317A which can display the combination of the one or more images 1317 with the drawn lines 1327 in the message bubble 1317A. The message bubble 1317A is displayed within the message transcript 1329 which also displays two other message bubbles 1335 and 1337.

Referring back to FIG. 15, the first device can then receive in operation 1009 a modified version of the image shown within message bubble 1317A. This modified image is received from a second messaging app which is executing on the other device in the conversation, which other device is operated by a user having the user name 1307. The modified set of one or more images can include additional drawn images or additional captured images or other modifications to the original image or additions to the original one or more images. These modifications, including any additions, are created in one embodiment by the counterpart image creation app on the second device operated by the user having the user name 1307. The modified one or more images can include additional lines, changing of color, adding more images, optionally additional drawings on those additional images, etc. FIG. 18E shows an example of the user interface of the first messaging app after having received a modified drawing in operation 1009. In particular, the second messaging app sent a text message shown in the messaging bubble 1339 in the message transcript 1329 in response to the text message shown in message bubble 1337. In addition to the text message shown in message bubble 1339, the user of the second device created a modified version of the one or more images sent by the first device and sent those modified one or more images back to the first device as shown in message bubble 1340 which includes a drawn modification 1341 in the image shown within the message bubble 1340. In addition, the prior message bubble 1317A has been converted into a bread crumb 1317B to indicate the relationship between the prior message bubble, now in the form of a bread crumb shown in FIG. 18E and the new message bubble 1340, both of which are identified by the same session identifier. In one embodiment, the first messaging app can convert all prior message bubbles into a respective bread crumb and present or display the last message bubble in the session as a message bubble, and this is shown in FIG. 18E. Thus FIG. 18E shows an example of operation 1011 after the prior message bubble 1317A has been converted into a bread crumb and a new message bubble identified by the same session identifier as bread crumb 1317B now presents the moved/modified content within the message bubble 1340. The user of communication device 1301 can then select the message bubble 1340 to cause the presentation of the user interface of the image creation app, which is shown in FIG. 18F in which the image creation app is shown in the expanded view mode. This can then allow the user of communication device 1301 to further modify the one or more images and send those back to the other user in the session.

Figure 16:
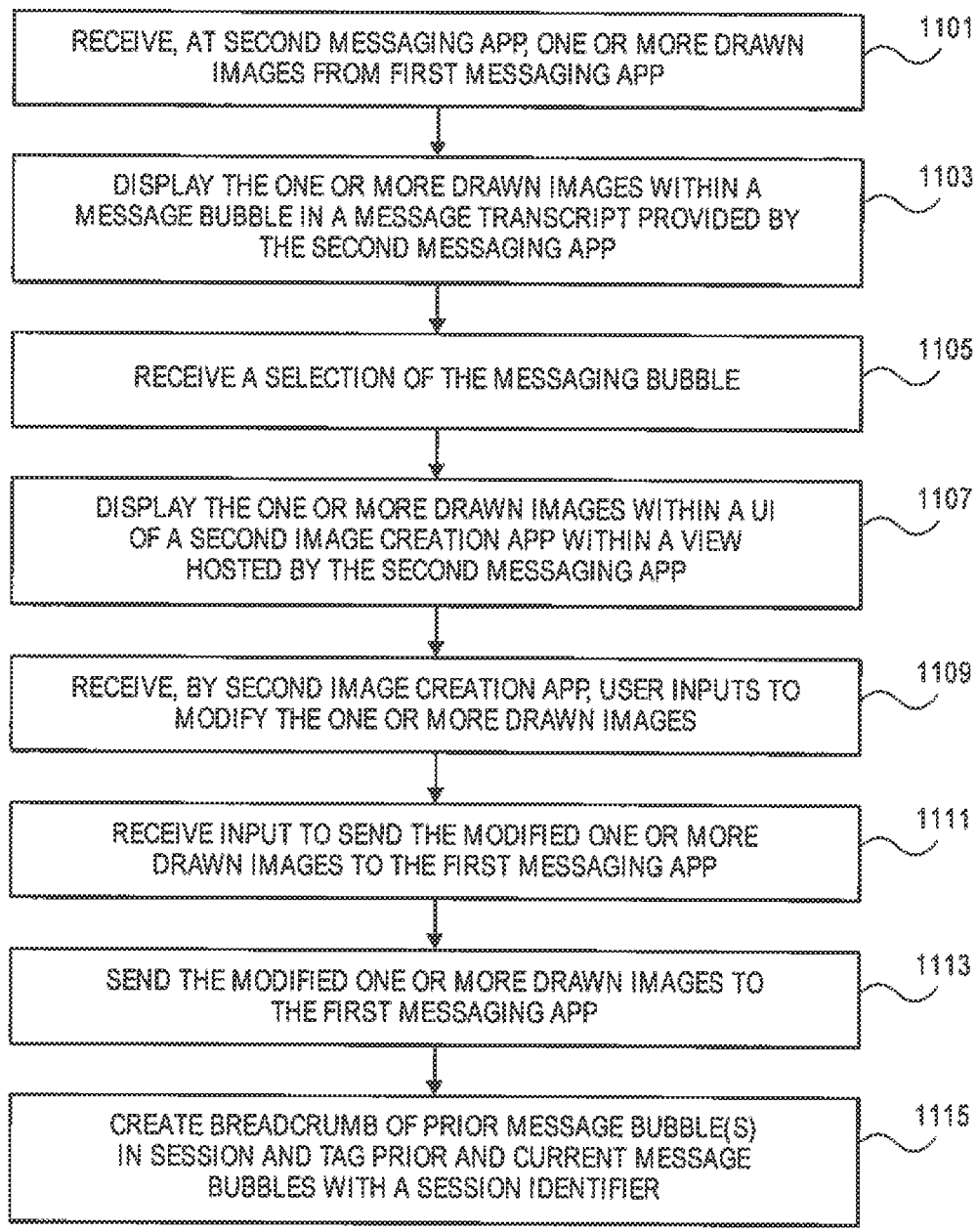
FIG. 16 is a flowchart which illustrates a method according to one embodiment described herein which supports a counterpart image creation app on a second device.

FIG. 16 shows an example of a method performed at the second device which is part of the session shown in FIGS. 18A through 18F. In particular, the method shown in FIG. 16 is a method performed by the second device which interacts with the first device which performs the method shown in FIG. 15. In each case, the image creation app on the first device and the image creation app on the second device can have the same app identifier and can operate as either a plug-in or an extension app in a view host by the respective messaging app. When the image creation app operates as an extension app, it provides the drawn and other content through an IPC to the messaging app in the manner described above. In operation 1101, the second messaging app on the second device receives one or more drawn images (which may also include a still image or video) from the first messaging app. This can occur in response to operation 1007 shown in FIG. 15 in which the first messaging app sends those one or more drawn images. Then in operation 1103, the second device displays the one or more drawn images (which may also include a still image or video) within a message bubble in a message transcript provided by the second messaging app. Then in operation 1105 the second messaging app can receive a selection of the message bubble which displays the one or more drawn images in the message transcript. In response to that selection which was received in operation 1105, the second messaging app can cause the launch of the second image creation app and then present a user interface of the second image creation app within a view hosted by the second messaging app in order to display the one or more drawn images within the user interface of the second image creation app. This is shown as operation 1107 in FIG. 16. Then in operation 1109, the second image creation app can receive one or more user inputs to modify the one or more drawn images or still images or video, and can then receive an input in operation 1111 which can be the user's selection of the "send" command to cause the sending in operation 1113 of the modified one or more drawn images to the first messaging app. Then in operation 1115, the second messaging app can create a bread crumb of the prior message bubble in the session and tag both the prior and the current message bubbles with the same session identifier.

Figure 17:
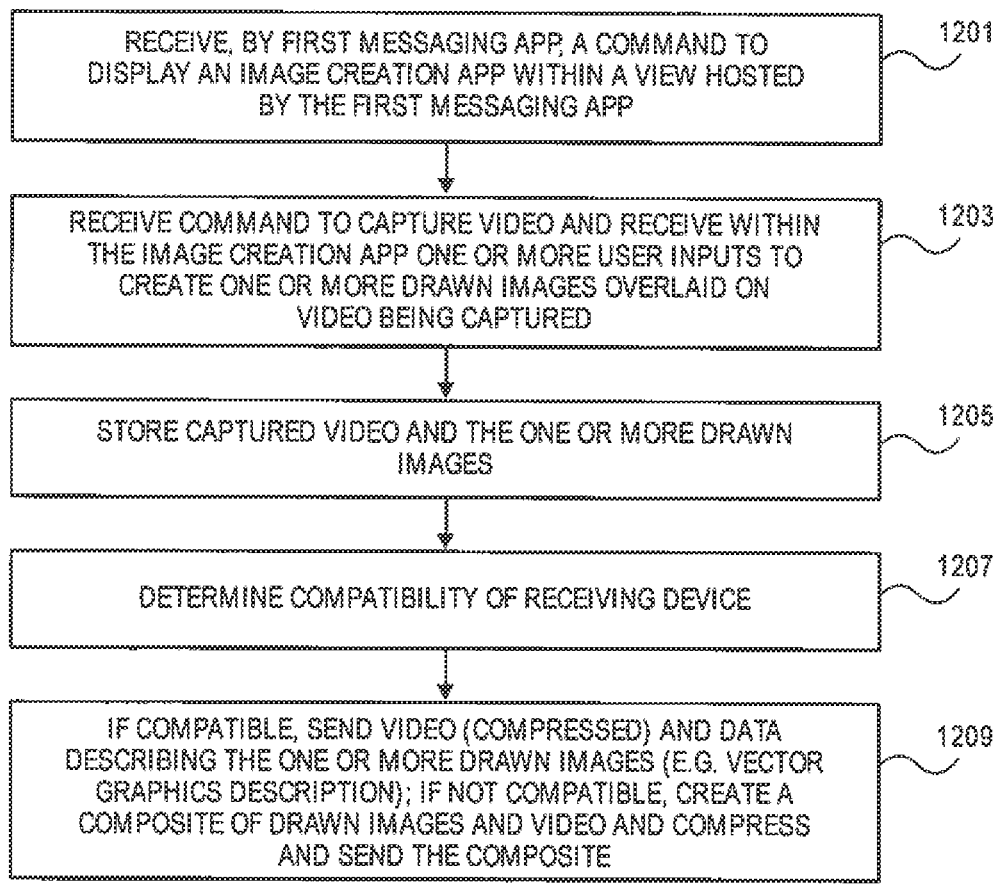
FIG. 17 is a flowchart which shows a method according to one embodiment for providing backward compatibility.

Another aspect of the embodiments described herein is shown in FIG. 17. In this embodiment, a drawing which was recorded during the recording of a video is stored as graphics data, such as vector graphics data specifying one or more bezier curves and this data is sent with the message which contains the recording video to the one or more messaging servers, and when the receiving device downloads the recorded video, it uses the graphics data to recreate the drawing at playback time, and the drawing is overlaid as it is recreated at playback time on the recorded video. For older devices or older operating systems that do not support this type of operation by a messaging app, then the sending device can create a composited and compressed video from the graphics data and transmit this composited and compressed video to the messaging server for retrieval by the older devices. In one embodiment, the sending device can determine from the one or more messaging servers the version of the messaging software or app on the receiving device prior to sending the message and the recorded video, and this allows the sending device to determine the compatibility of the receiving device before sending the recorded video on the graphics data. Referring now to FIG. 17, in operation 1201, a first messaging app receives the command to display an image creation app within a view hosted by the first messaging app. Then in operation 1203, the image creation app receives a command to capture video and can also receive within the image creation app one or more user inputs to create one or more drawn images which can be overlaid on the video either previously captured or being capture. Then in operation 1205, the image creation app stores the captured video and the one or more drawn images. In one embodiment, the captured video is stored as a compressed video file and the one or more drawn images are stored as graphics data, such as data specifying one or more bezier curves. In operation 1207, the sending device can determine the compatibility of the receiving device from information which can be provided by the one or more messaging servers which can include information about the version of the operating system or a version of the messaging app on the receiving device. In operation 1209, if the receiving device is compatible with the two groups of content then the first messaging app can send the compressed video and the graphics data describing the one or more drawn images separately to allow the receiving device to recreate from the graphics data the drawn images with the video at playback time. If on the other hand the receiving device is not compatible then the sending device will create a composite of the drawn images and the video and compress that composite and send the compressed composite to the receiving device.

In one embodiment, the messaging app can use time-to-live (TTL) values to remove the content was created automatically on both the sender's device and the receiver's device. On the sender device, the content and the message bubble created by the image creation app will expire (and be automatically removed/erased) unless the sender selects to keep it, which in effect eliminates the TTL value from being used. On the receiver device, the TTL value is not used (and thus the content is not automatically removed) if the user does not tap to view the created content, but once the user of the receiving device selects the message bubble to view the created content, then the TTL value is used (and the TTL timer has started), and the receiving user will need to select a command to keep the content on the receiver's device.

In one embodiment, an introductory drawing can be created in the image creation app before beginning to record the video and this drawing can be received and stored and used at playback time to display an introductory drawing once for only portion of the playback time, such as the beginning of the playback time, and the drawing inputted during the recording of the video can be played back in synchronization with the playback of the recording such that the drawing and recording are synched to the same clock. In one embodiment, the recording length can be limited to a predetermined period of time, such as ten seconds in order to limit the amount of data sent to the messaging system. In one embodiment, the playback of the drawing inputted while the video is recorded can be accelerated if it is slow by clamping the time between successive movements in the drawing to a maximum value, such as no more than 500 milliseconds is allowed between successive movements.

One or more Application Programming Interfaces (APIs) may be used in some embodiments. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API implementing component and the API-calling component may each be any one of an operating system, a library, a device driver, an API, an application program, or other module (it should be understood that the API-implementing component and the API-component may be the same or different type of module from each other). API-implementing components may in some cases be embodied at least in part in firmware, microcode, or other hardware logic. In some embodiments, an API may allow a client program (e.g., game center application) to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embodiment, call APIs from different providers such as a set of APIs from an OS provider and another set of APIs from a plug-in provider and another set of APIs from another provider (e.g. the provider of a software library) or creator of the another set of APIs.

Figure 19:
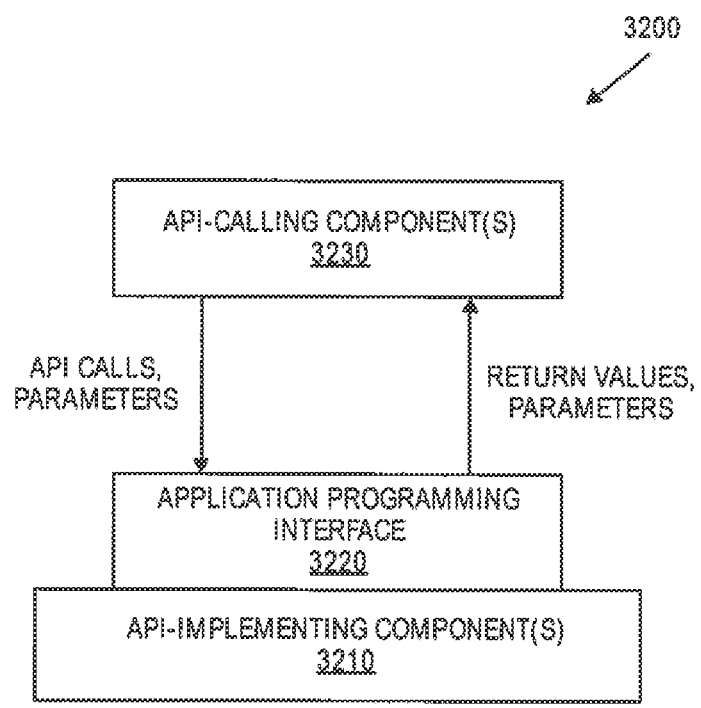
FIG. 19 is a block diagram illustrating an exemplary API architecture, which may be used in one or more of the embodiments described herein.

FIG. 19 is a block diagram illustrating an exemplary API architecture, which may be used in one embodiment of the present invention. As shown in FIG. 19, the API architecture 3200 includes the API-implementing component 3210 (e.g., an operating system, a library, a device driver, an API, an application program, software or other module) that implements the API 3220. The API 3220 specifies one or more functions, methods, classes, objects, protocols, data structures, formats and/or other features of the API-implementing component that may be used by the API-calling component 3230. The API 3220 can specify at least one calling convention that specifies how a function in the API-implementing component receives parameters from the API-calling component and how the function returns a result to the API-calling component. The API-calling component 3230 (e.g., an operating system, a library, a device driver, an API, an application program, software or other module) makes API calls through the API 3220 to access and use the features of the API-implementing component 3210 that are specified by the API 3220. The API-implementing component 3210 may return a value through the API 3220 to the API-calling component 3230 in response to an API call.

It will be appreciated that the API-implementing component 3210 may include additional functions, methods, classes, data structures, and/or other features that are not specified through the API 3220 and are not available to the API-calling component 3230. It should be understood that the API-calling component 3230 may be on the same system as the API-implementing component 3210 or may be located remotely and accesses the API-implementing component 3210 using the API 3220 over a network. While FIG. 19 illustrates a single API-calling component 3230 interacting with the API 3220, it should be understood that other API-calling components, which may be written in different languages (or the same language) than the API-calling component 3230, may use the API 3220.

The API-implementing component 3210, the API 3220, and the API-calling component 3230 may be stored in a machine-readable medium (e.g., computer-readable medium), which includes any mechanism for storing information in a form readable by a machine (e.g. a computer or other data processing system). For example, a machine-readable medium includes magnetic disks, optical disks, random access memory; read only memory, flash memory devices, etc.

Figure 20:
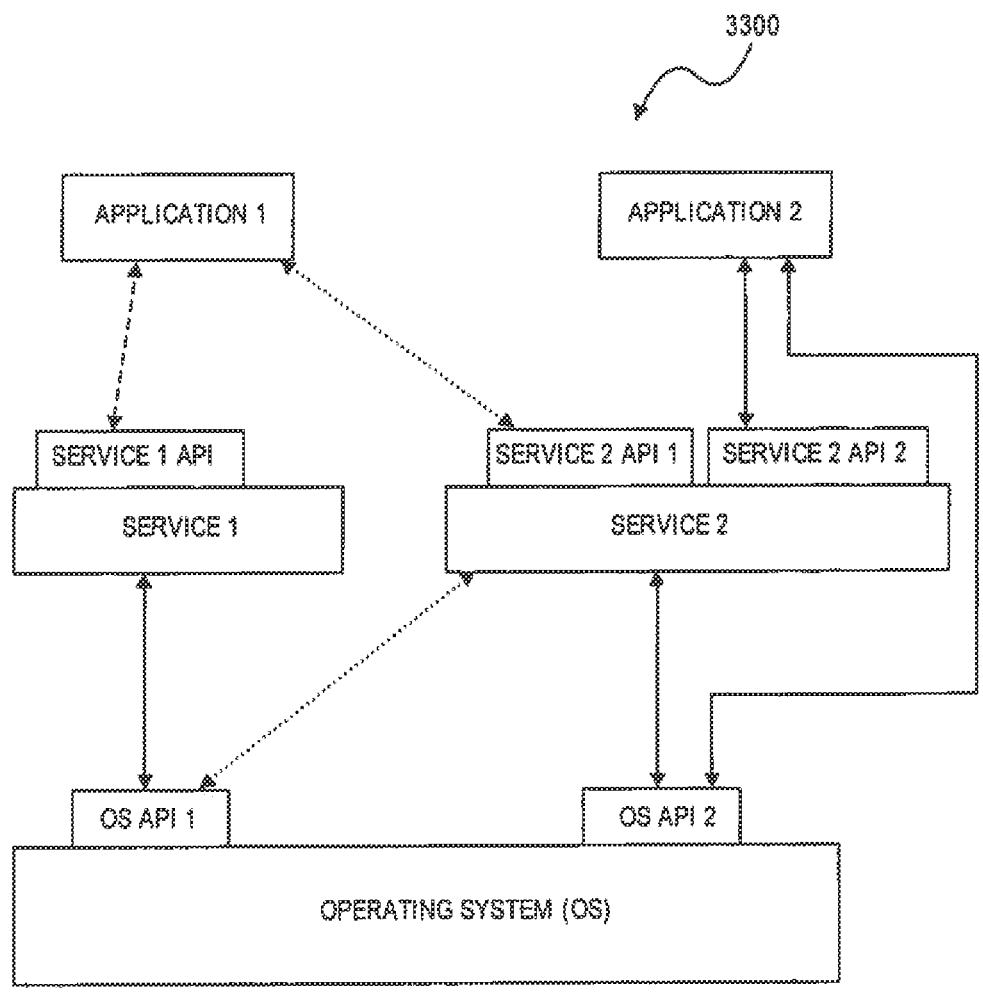
FIG. 20 shows a block diagram illustrating a software stack which can include one or more applications and services in operating systems.

In FIG. 20 ("Software Stack"), in one embodiment of the present invention, applications can make calls to Services A or B using several Service APIs and to Operating System (OS) using several OS APIs. Services A and B can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

The systems and methods described herein can be implemented in a variety of different data processing systems and devices, including general-purpose computer systems, special purpose computer systems, or a hybrid of general purpose and special purpose computer systems. Exemplary data processing systems that can use any one of the methods described herein include desktop computers, laptop computers, tablet computers, smart phones, cellular telephones, personal digital assistants (PDAs), embedded electronic devices, or consumer electronic devices.

Figure 21:
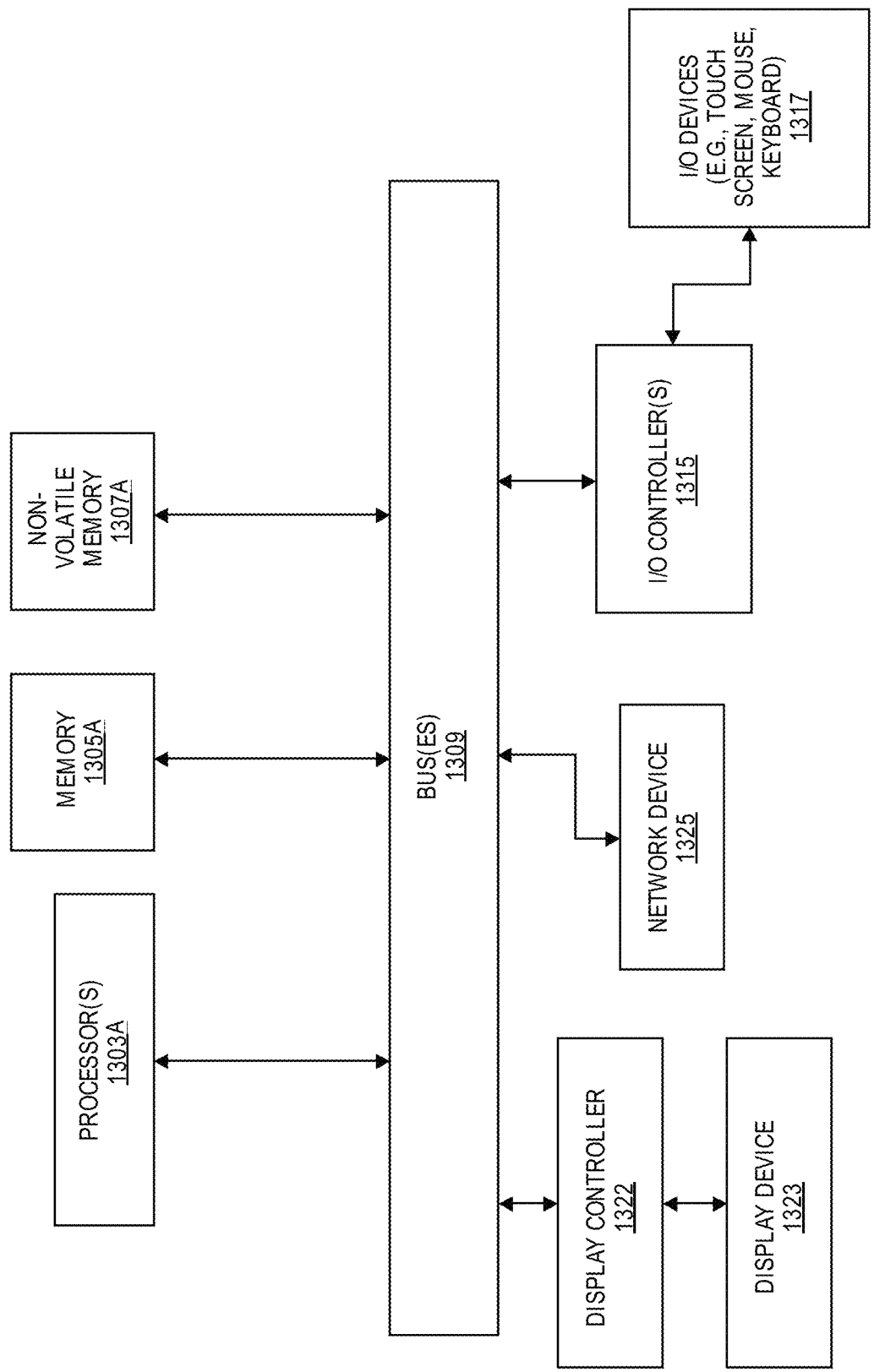
FIG. 21 shows an example of a data processing system which can be used in one or more embodiments described herein.

FIG. 21 is a block diagram of data processing system hardware according to an embodiment. Note that while FIG. 21 illustrates the various components of a data processing system that may be incorporated into a mobile or handheld device, it is not intended to represent any particular architecture or manner of interconnecting the components as such details are not germane to the present invention. It will also be appreciated that other types of data processing systems that have fewer components than shown or more components than shown in FIG. 21 can also be used with the present invention.

As shown in FIG. 21, the data processing system includes one or more buses 1309 that serve to interconnect the various components of the system. One or more processors 1303A are coupled to the one or more buses 1309 as is known in the art. Memory 1305A may be DRAM or non-volatile RAM or may be flash memory or other types of memory or a combination of such memory devices. This memory is coupled to the one or more buses 1309 using techniques known in the art. The data processing system can also include non-volatile memory 1307A, which may be a hard disk drive or a flash memory or a magnetic optical drive or magnetic memory or an optical drive or other types of memory systems that maintain data even after power is removed from the system. The non-volatile memory 1307A and the memory 1305A are both coupled to the one or more buses 1309 using known interfaces and connection techniques. A display controller 1322 is coupled to the one or more buses 1309 in order to receive display data to be displayed on a display device 1323. The display device 1323 can include an integrated touch input to provide a much screen. The data processing system can also include one or more input/output (I/O) controllers 1315 which provide interfaces for one or more I/O devices, such as one or more mice, touch screens, touch pads, joysticks, and other input devices including those known in the art and output devices (e.g. speakers). The input/output devices 1317 are coupled through one or more I/O controllers 1315 as is known in the art.

While FIG. 21 shows that the non-volatile memory 1307A and the memory 1305A are coupled to the one or more buses directly rather than through a network interface, it will be appreciated that the present invention can utilize non-volatile memory that is remote from the system, such as a network storage device which is coupled to the data processing system through a network interface such as a modem or Ethernet interface. The buses 1309 can be connected to each other through various bridges, controllers and/or adapters as is well known in the art. In one embodiment the I/O controller 1315 includes one or more of a USB (Universal Serial Bus) adapter for controlling USB peripherals, an IEEE 1394 controller for IEEE 1394 compliant peripherals, or a Thunderbolt controller for controlling Thunderbolt peripherals. In one embodiment, one or more network device(s) 1325 can be coupled to the bus(es) 1309. The network device(s) 1325 can be wired network devices (e.g., Ethernet) or wireless network devices (e.g., WI-FI, Bluetooth).

It will be apparent from this description that aspects of the present invention may be embodied, at least in part, in software. That is, the techniques may be carried out in a data processing system in response to its processor executing a sequence of instructions contained in a storage medium, such as a non-transitory machine-readable storage medium (e.g. DRAM or flash memory). In various embodiments, hardwired circuitry may be used in combination with software instructions to implement the present invention. Thus the techniques are not limited to any specific combination of hardware circuitry and software, or to any particular source for the instructions executed by the data processing system. Moreover, it will be understood that where mobile or handheld devices are described, the description encompasses mobile devices (e.g., laptop devices, tablet devices), handheld devices (e.g., smartphones), as well as embedded systems suitable for use in wearable electronic devices.

The present disclosure recognizes that the use of personal information data (such as health data collected by one or more watches), in the present technology, can be used to the benefit of users. For example, the personal information data can be used to deliver health related information or targeted content that is of greater interest to the user. Accordingly, use of such personal information data can enable calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of health information or advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable program instructions which when executed by a data processing system cause the data processing system to perform a method comprising:
   displaying a first messaging app on a first device, the first messaging app configured to communicate text messages with other messaging apps including a second messaging app on a second device through one or more messaging services;
   receiving a command to display first app within a view hosted by the first messaging app, the first app being either a plugin of the first messaging app or an extension app of the first messaging app, the first app having been downloaded by and installed within the first messaging app for use within the first messaging app; and
   displaying, in response to the command, a user interface of the first app within the view, the user interface configured to receive one or more user inputs of a user of the image creation app.

2. The medium as in claim 1 wherein the method comprises:
   receiving the one or more user inputs on a drawing canvas within the view to create one or more drawn images and storing the one or more drawn images; and
   receiving a command to send the one or more drawn images to the second messaging app.

3. The medium as in claim 2 wherein the method further comprises:
   sending the one or more drawn images to the second messaging app through one or more messaging servers.

4. The medium as in claim 3 wherein the one or more drawn images are sent in an encrypted form to the second messaging app and wherein the view accepts the one or more user inputs in a screen area, in which an on-screen keyboard of the first messaging app was displayed.

5. The medium as in claim 3 wherein the command to display the first app is one on (a) the user's selection of an icon in a UI of the first messaging app; or (b) the user's selection of a message bubble containing data sent by the first messaging app or the second messaging app.

6. The medium as in claim 3 wherein the first app calls, through an API, to the first messaging app to request a change of the first app's view within the first messaging app, wherein the change is a switch between a compact view, in which a message transcript of the first messaging app is viewable, and an expanded view in which the messaging transcript is not viewable.

7. The medium as in claim 2, the method further comprising capturing one or more images through a camera on the first device, the one or more captured images being displayed within a view hosted by the first messaging app;
   receiving the one or more drawn images as an overlay on the one or more captured images; and
   generating data describing the one or more drawn images, wherein the one or more captured images shows a video or a still image.

8. The medium as in claim 7 wherein the first messaging app determines whether the second messaging app is compatible with content from the first app and if it is the first messaging app sends the one or more captured images and the data describing the one or more drawn images; and if the second messaging app is not compatible with the content from the first app, the first messaging app creates a composite of the one or more captured images and the one or more drawn images and compresses the composite and sends the compressed composite to the second messaging app.

9. The medium as in claim 8 wherein the method further comprises:
receiving, from the second messaging app, a set of one or more of:
the one or more captured images;
the one or more drawn images;
one or more additional captured images captured by a camera on the second device; and
one or more additional or modified drawn images created by a second app hosted by the second messaging app.

10. The medium as in claim 9, the method further comprising:
creating a breadcrumb representation of a prior message bubble that displayed the one or more drawn images; and
displaying a new message bubble displaying the set of one or more of:
the one or more captured images;
the one or more drawn images;
one or more additional captured images captured by a camera on the second device; and
one or more additional or modified drawn images created by a second app hosted by the second messaging app.

11. The machine readable medium of claim 1, wherein downloading and installing of the first app is controlled exclusively by the first messaging app.

12. The machine readable medium of claim 1, wherein the first app having been downloaded by and installed within the first messaging app for use within, and in conjunction with, the first messaging app.

13. A machine implemented method comprising:
displaying a first messaging app on a first device, the first messaging app configured to communicate text messages with other messaging apps including a second messaging app on a second device through one or more messaging services;
receiving a command to display a first app within a view hosted by the first messaging app, the first app being either a plugin of the first messaging app or an extension app of the first messaging app, the first app having been installed within the first messaging app for use within the first messaging app; and
displaying, in response to the command, a user interface of the first app within the view, the user interface configured to receive one or more user inputs of a user of the first app.

14. The method as in claim 13 wherein the method comprises:
receiving the one or more user inputs on a drawing canvas within the view to create one or more drawn images and storing the one or more drawn images; and
receiving a command to send the one or more drawn images to the second messaging app.

15. The method as in claim 14 wherein the method further comprises:
sending the one or more drawn images to the second messaging app through one or more messaging servers.

16. The method as in claim 15 wherein the command to display the first app is one of:

(a) the user's selection of an icon in a UI of the first messaging app; or
(b) the user's selection of a message bubble containing data sent by the first messaging app or the second messaging app.

17. The method as in claim 15 wherein the first app calls, through an API, to the first messaging app to request a change of the first app's view within the first messaging app, wherein the change is a switch between a compact view, in which a message transcript of the first messaging app is viewable, and an expanded view in which the message transcript is not viewable.

18. The method as in claim 14, the method further comprising:
capturing one or more images through a camera on the first device, the one or more captured images being displayed within a view hosted by the first messaging app;
receiving the one or more drawn images as an overlay on the one or more captured images; and
generating data describing the one or more drawn images, wherein the one or more captured images shows a video or a still image.

19. The method as in claim 18 wherein the first messaging app determines whether the second messaging app is compatible with content from the first app and if it is the first messaging app sends the one or more captured images and the data describing the one or more drawn images; and if the second messaging app is not compatible with the content from the first app, the first messaging app creates a composite of the one or more captured images and the one or more drawn images and compresses the composite and sends the compressed composite to the second messaging app.

20. The method as in claim 19 wherein the method further comprises:
receiving, from the second messaging app, a set of one or more of:
the one or more captured images;
the one or more drawn images;
one or more additional captured images captured by a camera on the second device; and
one or more additional or modified drawn images created by a second app hosted by the second messaging app.

21. The method as in claim 20, the method further comprising:
creating a breadcrumb representation of a prior message bubble that displayed the one or more drawn images; and
displaying a new message bubble displaying the set of one or more of:
the one or more captured images;
the one or more drawn images;
one or more additional captured images captured by a camera on the second device; and
one or more additional or modified drawn images created by a second app hosted by the second messaging app.

22. The method of claim 13, wherein the first app having been downloaded by and installed within the first messaging app for use within, and in conjunction with, the first messaging app.

23. A device comprising:
at least one processor; and a memory including instructions that, when executed by the at least one processor, cause the at least one processor to:
- display a first messaging app on a first device, the first messaging app configured to communicate text messages with other messaging apps including a second messaging app on a second device through one or more messaging services;
- receive a command to display a first app within a view hosted by the first messaging app, the first app being either a plugin of the first messaging app or an extension app of the first messaging app, the first app having been downloaded by and installed within the first messaging app for use within the first messaging app; and
- display, in response to the command, a user interface of the first app within the view, the user interface configured to receive one or more user inputs of a user of the first app.

24. The device of claim 23, wherein the first app having been downloaded by and installed within the first messaging app for use within, and in conjunction with, the first messaging app.

* * * * *

UNITED STATES PATENT AND TRADEMARK OFFICE
CERTIFICATE OF CORRECTION

PATENT NO. : 10,852,912 B2
APPLICATION NO. : 15/399115
DATED : December 1, 2020
INVENTOR(S) : Nicholas V. King et al.

Page 1 of 1

It is certified that error appears in the above-identified patent and that said Letters Patent is hereby corrected as shown below:

In the Claims

Column 34, Line 14 (Claim 1), Insert --a-- after "display";

Column 34, Line 24 (Claim 1), Replace "image creation" with --first--.

Signed and Sealed this
Twenty-third Day of February, 2021

Drew Hirshfeld
*Performing the Functions and Duties of the
Under Secretary of Commerce for Intellectual Property and
Director of the United States Patent and Trademark Office*